(12) United States Patent
Pan et al.

(10) Patent No.: US 10,834,778 B2
(45) Date of Patent: Nov. 10, 2020

(54) METHOD AND APPARATUS OF HANDLING BANDWIDTH PART INACTIVITY TIMER IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 83 days.

(21) Appl. No.: 16/240,172

(22) Filed: Jan. 4, 2019

(65) Prior Publication Data

US 2019/0215900 A1 Jul. 11, 2019

Related U.S. Application Data

(60) Provisional application No. 62/615,187, filed on Jan. 9, 2018.

(51) Int. Cl.
*H04W 4/00* (2018.01)
*H04W 76/38* (2018.01)
*H04L 5/00* (2006.01)
*H04W 76/27* (2018.01)
*H04W 72/12* (2009.01)
*H04L 27/26* (2006.01)
*H04W 72/04* (2009.01)

(52) U.S. Cl.
CPC .......... *H04W 76/38* (2018.02); *H04L 5/0098* (2013.01); *H04L 27/2666* (2013.01); *H04W 72/042* (2013.01); *H04W 72/121* (2013.01); *H04W 76/27* (2018.02)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2013/0343252 A1 | 12/2013 | Chakraborty | |
| 2019/0104539 A1* | 4/2019 | Park | H04W 72/042 |
| 2019/0141742 A1* | 5/2019 | Zhou | H04W 72/042 |
| 2019/0150183 A1* | 5/2019 | Aiba | H04W 72/0446 |
| | | | 370/336 |

FOREIGN PATENT DOCUMENTS

| | | |
|---|---|---|
| WO | 2018075828 | 4/2018 |
| WO | 2018085145 | 5/2018 |

\* cited by examiner

*Primary Examiner* — Siren Wei
(74) *Attorney, Agent, or Firm* — Blue Capital Law Firm, P.C.

(57) ABSTRACT

A method and apparatus are disclosed from the perspective of a network node. In one embodiment, the method includes configuring a UE (User Equipment) with a bandwidth part. The method further includes configuring the UE to use a bandwidth part timer for the bandwidth part. The method also includes configuring the UE with SPS resource on the bandwidth part. In addition, the method includes configuring the UE not to use the bandwidth part timer if length of the bandwidth part timer is shorter than SPS (Semi-Persistent Scheduling) interval for the SPS resource.

17 Claims, 26 Drawing Sheets

METHOD AND APPARATUS OF HANDLING BANDWIDTH PART INACTIVITY TIMER IN A WIRELESS COMMUNICATION SYSTEM

CROSS-REFERENCE TO RELATED APPLICATIONS

The present Application claims the benefit of U.S. Provisional Patent Application Ser. No. 62/615,187 filed on Jan. 9, 2018, the entire disclosure of which is incorporated herein in its entirety by reference.

FIELD

This disclosure generally relates to wireless communication networks, and more particularly, to a method and apparatus of handling bandwidth part inactivity timer in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network node. In one embodiment, the method includes configuring a UE (User Equipment) with a bandwidth part. The method further includes configuring the UE to use a bandwidth part timer for the bandwidth part. The method also includes configuring the UE with SPS resource on the bandwidth part. In addition, the method includes configuring the UE not to use the bandwidth part timer if length of the bandwidth part timer is shorter than SPS (Semi-Persistent Scheduling) interval for the SPS resource.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V2.0.0, "NR and NG-RAN Overall Description; Stage 2"; RAN1#88bis Chairman's note; RAN1#89 Chairman's note; RAN1 adhoc #2 Chairman's note; RAN1#90 Chairman's note; RAN1 adhoc #3 Chairman's note; RAN1#90bis Chairman's note; RAN1#91 Chairman's note; RAN2#99bis Chairman's note; RAN2#100 Chairman's note; TS 38.321 V2.0.0, "Medium Access Control (MAC) protocol specification"; TS 38.331 V0.4.0, "Radio Resource Control (RRC) protocol specification"; and TS 36.331 V14.4.0, "Radio Resource Control (RRC) protocol specification". The standards and documents listed above are hereby expressly incorporated by reference in their entirety.

Figure 1:
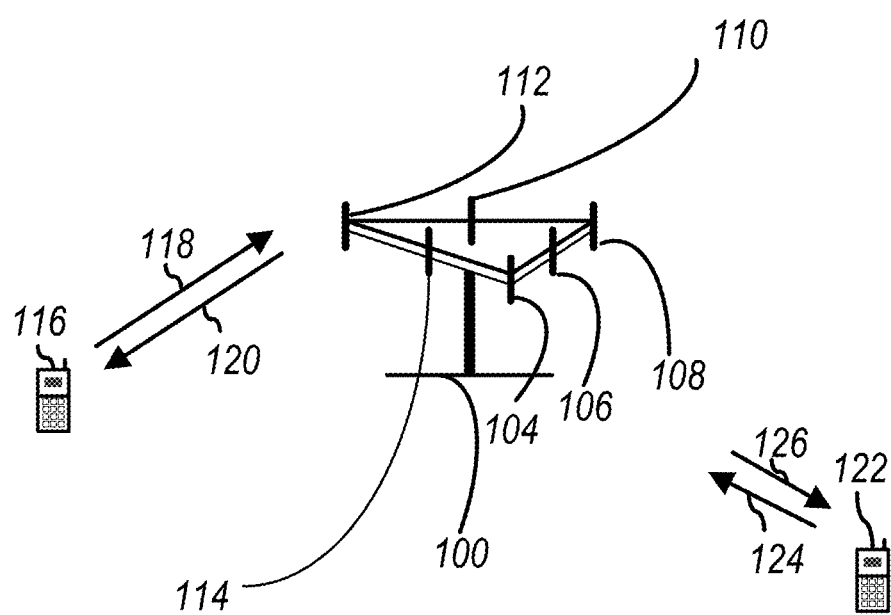
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
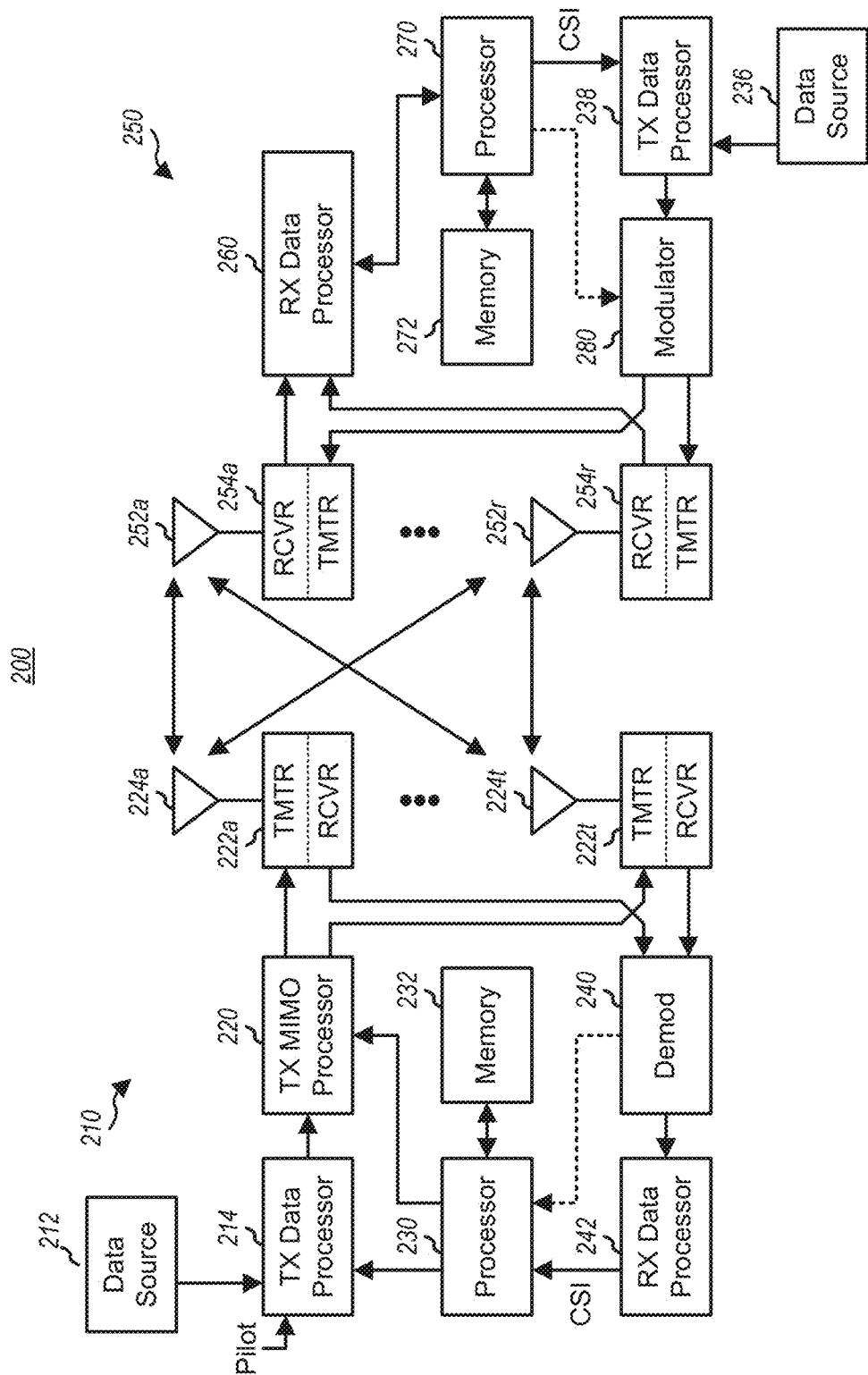
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
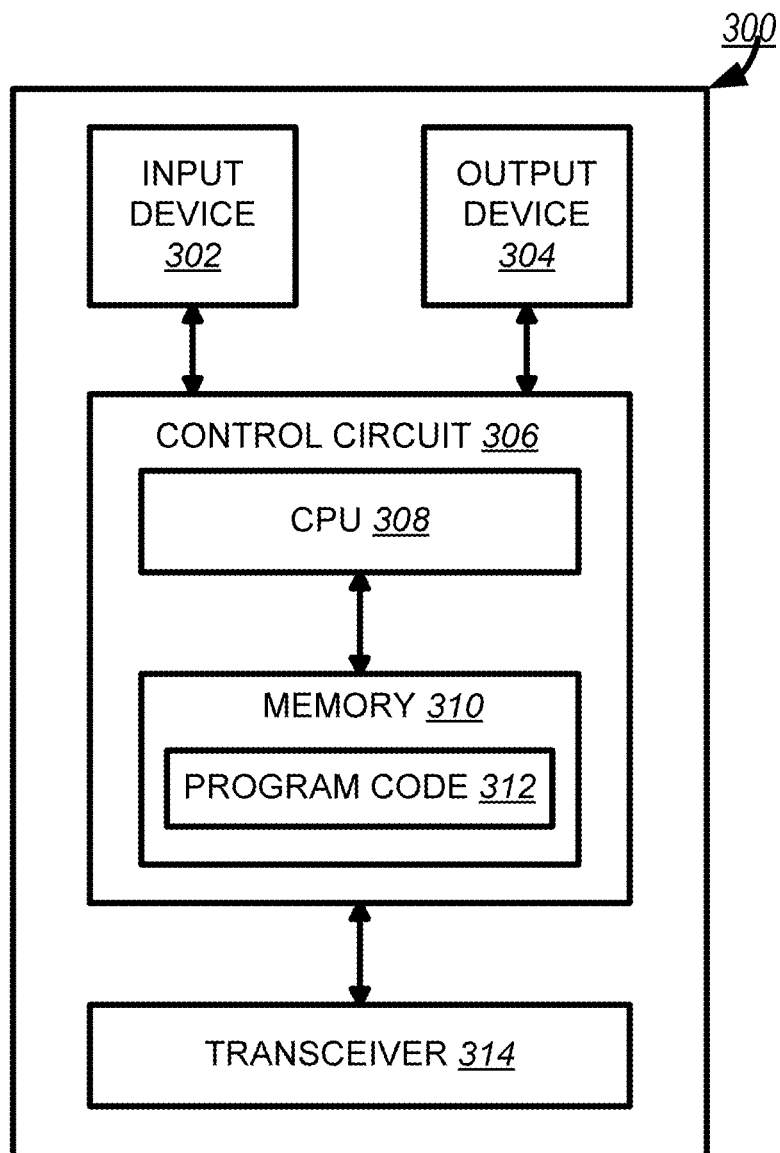
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
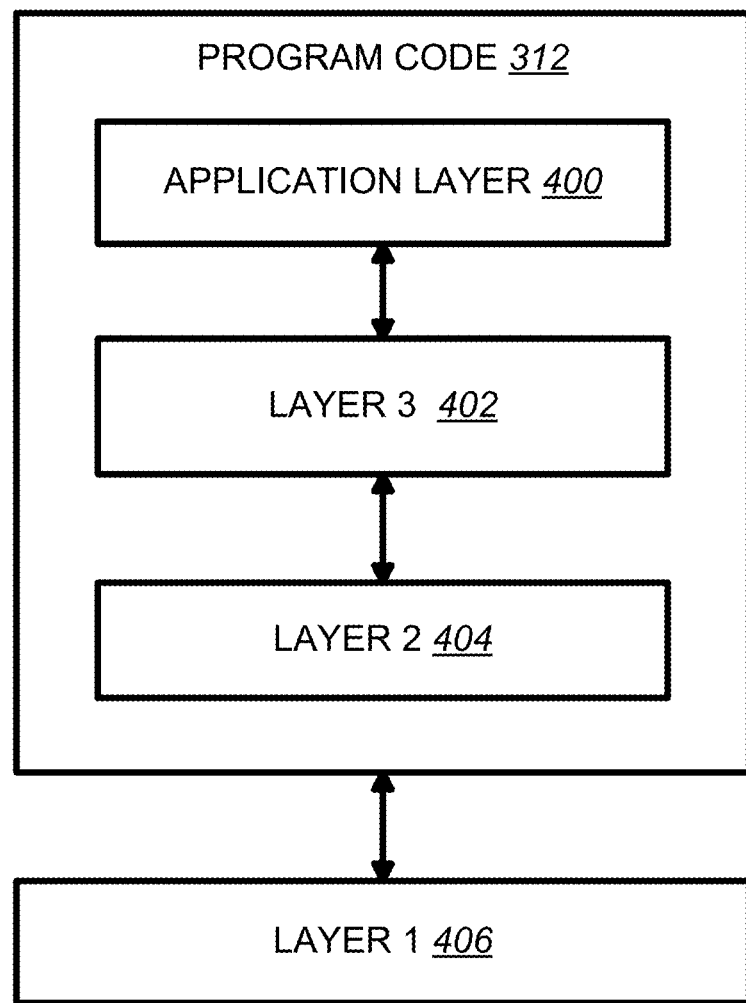
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Figure 5:
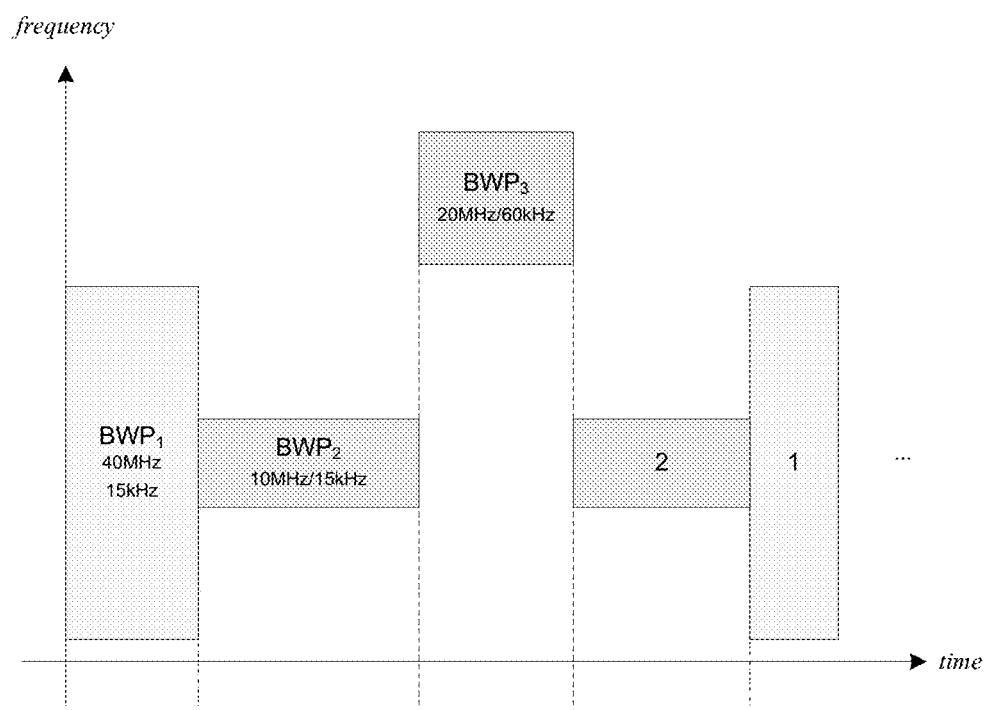
FIG. 5 is a reproduction of FIGS. 6.10-1 of 3GPP TS 38.300 V2.0.0.
Figure 6:
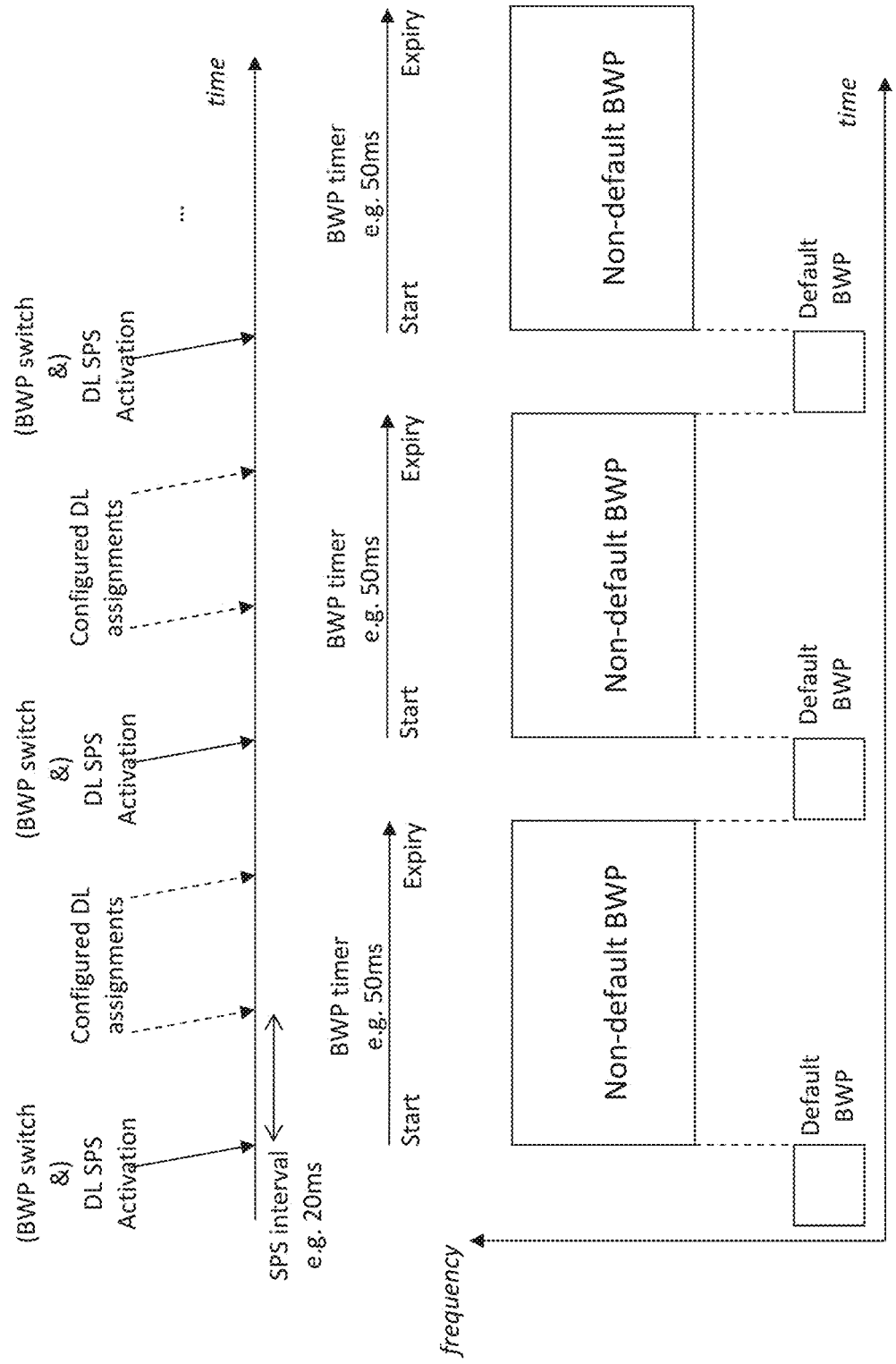
FIG. 6 is a diagram according to one embodiment.

3GPP TS 38.300 introduced bandwidth part (BWP) as follows:
6.10 Bandwidth Adaptation
With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.
FIGS. 6.10-1 below describes a scenario where 3 different BWPs are configured:
  $BWP_1$ with a width of 40 MHz and subcarrier spacing of 15 kHz;
  $BWP_2$ with a width of 10 MHz and subcarrier spacing of 15 kHz;
  $BWP_3$ with a width of 20 MHz and subcarrier spacing of 60 kHz.
[FIGS. 6.10-1 of 3GPP TS 38.300 V2.0.0, Entitled "BA Example", is Reproduced as FIG. 5]
10.6 Activation/Deactivation Mechanism
[ . . . ]
To enable reasonable UE battery consumption when BA is configured, only one BWP pair can be active at a time, all others BWPs that the UE is configured with being deactivated. On deactivated BWPs, the UE does not monitor the PDCCH, does not transmit on PUCCH, PRACH and UL-SCH.

Some agreements made in RAN1#88bis meeting are captured in the RAN1#88bis Chairman's note as follows:
Working Assumption:
  One or multiple bandwidth part configurations for each component carrier can be semi-statically signalled to a UE
  A bandwidth part consists of a group of contiguous PRBs
    Reserved resources can be configured within the bandwidth part
  The bandwidth of a bandwidth part equals to or is smaller than the maximal bandwidth capability supported by a UE
  The bandwidth of a bandwidth part is at least as large as the SS block bandwidth
    The bandwidth part may or may not contain the SS block
  Configuration of a bandwidth part may include the following properties
  Numerology
    Frequency location (e.g. center frequency)
    Bandwidth (e.g. number of PRBs)
  Note that it is for RRC connected mode UE
  FFS how to indicate to the UE which bandwidth part configuration (if multiple) should be assumed for resource allocation at a given time
  FFS neighbour cell RRM The NR (New RAT/Radio) MAC (Medium Access Control) specified transmission and reception without dynamic scheduling in 3GPP TS 38.321 as follows:
5.8 Transmission and Reception without Dynamic Scheduling
5.8.1 Downlink
Semi-Persistent Scheduling (SPS) is configured by RRC per serving cell and per BWP. Multiple configurations can be active simultaneously only on different serving cells. Activation and deactivation of the DL SPS are independent among the Serving Cells.
For the DL SPS, a DL assignment is provided by PDCCH, and stored or cleared based on L1 signalling indicating SPS activation or deactivation.
RRC configures the following parameters when SPS is configured:
  cs-RNTI: CS-RNTI for both activation, deactivation, and retransmission;
  semiPersistSchedIntervalDL: Interval of SPS.
When SPS is released by upper layers, all the corresponding configurations shall be released.
After a downlink assignment is configured for SPS, the MAC entity shall consider sequentially that the $N^{th}$ assignment occurs in the slot for which:

$$(numberOfSlotsPerFrame*SFN+slot\ number\ in\ the\ frame)=[(numberOfSlotsPerFrame*SFN_{start\ time}+slot_{start\ time})+N*semiPersistSchedIntervalDL*number\ OfSlotsPerFrame/10]\ modulo\ 1024$$

where SFNstart time and slotstart time are the SFN and slot, respectively, at the time the configured downlink assignment were (re-)initialised.
5.8.2 Uplink
There are two types of transmission without dynamic grant:
  configured grant Type 1 where an uplink grant is provided by RRC, and stored as configured uplink grant;
  configured grant Type 2 where an uplink grant is provided by PDCCH, and stored or cleared as configured uplink grant based on L1 signalling indicating configured grant activation or deactivation.
Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

RRC configures the following parameters when the configured grant Type 1 is configured:
  cs-RNTI: CS-RNTI for retransmission;
  periodicity: periodicity of the configured grant Type 1;
  timeDomainOffset: Offset of a resource with respect to SFN=0 in time domain;
  numberOfConfGrant-Processes: the number of HARQ processes.

RRC configures the following parameters when the configured grant Type 2 is configured:
  cs-RNTI: CS-RNTI for both activation, deactivation, and retransmission;
  periodicity: periodicity of the configured grant Type 2;
  numberOfConfGrant-Processes: the number of HARQ processes.

Upon configuration of a configured grant Type 1 for a serving cell by upper layers, the MAC entity shall:
  1> store the uplink grant provided by upper layers as a configured uplink grant for the indicated serving cell;
  1> initialise (if not active) or re-initialise (if already active) the configured uplink grant to start in the symbol according to timeDomainOffset and to reoccur with periodicity.

After an uplink grant is configured for a configured grant Type 1, the MAC entity shall consider sequentially that the Nth uplink grant occurs associated with the symbol for which:

$$[(SFN*numberOfSlotsPerFrame*numberOfSymbolsPerSlot)+(slot\ number\ in\ the\ frame*numberOfSymbolsPerSlot)+symbol\ number\ in\ the\ slot]=(timeDomainOffset+N*periodicity)\ modulo\ 1024$$

After an uplink grant is configured for a configured grant Type 2, the MAC entity shall consider sequentially that the Nth uplink grant occurs associated with the symbol for which:

$$[(SFN*numberOfSlotsPerFrame*numberOfSymbolsPerSlot)+(slot\ number\ in\ the\ frame*numberOf\text{-}SymbolsPerSlot)+symbol\ number\ in\ the\ slot]=[(SFN_{start\ time}*numberOfSlotsPerFrame*numberOf\text{-}SymbolsPerSlot+slot_{start\ time}*numberOfSymbolsPerSlot+symbol_{start\ time})+N*periodicity]\ modulo\ 1024$$

where $SFN_{start\ time}$, $slot_{start\ time}$, and $symbol_{start\ time}$ are the SFN, slot, and symbol, respectively, at the time the configured uplink grant was (re-)initialised.

When a configured grant is released by upper layers, all the corresponding configurations shall be released and all corresponding uplink grants shall be cleared immediately.

The MAC entity shall:
  1> if the configured grant has been triggered and not cancelled; and
  1> if the MAC entity has UL resources allocated for new transmission:
    2> instruct the Multiplexing and Assembly procedure to generate an Configured Grant Confirmation MAC CE as defined in subclause 6.1.3.7;
    2> cancel the triggered configured grant confirmation.

For a configured grant Type 2, the MAC entity shall clear the configured uplink grant immediately after first transmission of Configured Grant Confirmation MAC CE triggered by the configured grant deactivation.

Retransmissions except for repetition of configured grants use uplink grants addressed to CS-RNTI.

The NR MAC Running Technical Specification is currently under discussion. 3GPP TS 38.321 includes the following description related to BWP operation:

5.15 Bandwidth Part (BWP) Operation

A Serving Cell may be configured with at most four BWPs, and for an activated Serving Cell, there is always one active BWP at any point in time.

The BWP switching for a Serving Cell is used to activate an inactive BWP and deactivate an active BWP at a time, and is controlled by the PDCCH indicating a downlink assignment or an uplink grant. Upon addition of SpCell or activation of an SCell, one BWP is initially active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

On the active BWP for each activated Serving Cell configured with a BWP, the MAC entity shall apply normal operations including:
  1> transmit on UL-SCH;
  1> transmit on RACH;
  1> monitor the PDCCH;
  1> transmit PUCCH;
  1> receive DL-SCH;
  1> (re-)initialize any suspended configured uplink grants of configured grant Type 1 according to the stored configuration, if any, and to start in the symbol according to rules in subclause 5.8.2.

On the inactive BWP for each activated Serving Cell configured with a BWP, the MAC entity shall:
  1> not transmit on UL-SCH;
  1> not transmit on RACH;
  1> not monitor the PDCCH;
  1> not transmit PUCCH;
  1> not receive DL-SCH;
  1> clear any configured downlink assignment and configured uplink grant of configured grant Type 2;
  1> suspend any configured uplink grant of configured Type 1.

Upon initiation of the Random Access procedure, the MAC entity shall:
  1> if PRACH resources are configured for the active UL BWP:
    2> perform the Random Access procedure on the active DL BWP and UL BWP;
  1> else (i.e. PRACH resources are not configured for the active UL BWP):
    2> switch to initial DL BWP and UL BWP;
    2> perform the Random Access procedure on the initial DL BWP and UL BWP.

If the MAC entity receives a PDCCH for BWP switching while a Random Access procedure is ongoing in the MAC entity, it is up to UE implementation whether to switch BWP or ignore the PDCCH for BWP switching. If the MAC entity decides to perform BWP switching, the MAC entity shall stop the ongoing Random Access procedure and initiate a Random Access procedure on the new activated BWP. If the MAC decides to ignore the PDCCH for BWP switching, the MAC entity shall continue with the ongoing Random Access procedure on the active BWP.

If BWP-InactivityTimer is configured, the MAC entity shall for each activated Serving Cell:
  1> if the Default-DL-BWP is configured, and the active DL BWP is not the BWP indicated by the Default-DL-BWP; or
  1> if the Default-DL-BWP is not configured, and the active DL BWP is not the initial BWP:
    2> if a PDCCH indicating downlink assignment is received on the active BWP; or 2> if a PDCCH for BWP switching is received on the active DL BWP, and the MAC entity switches the active BWP:
   3> start or restart the BWP-InactivityTimer associated with the active DL BWP;
2> if Random Access procedure is initiated:
   3> stop the BWP-InactivityTimer;
2> if BWP-InactivityTimer associated with the active DL BWP expires:
   3> if the Default-DL-BWP is configured:
      4> perform BWP switching to a BWP indicated by the Default-DL-BWP;
   3> else:
      4> perform BWP switching to the initial DL BWP.

3GPP TS 38.331 specified bandwidth part related configuration as follows:
   BandwidthPart-Config
The BandwidthPart-Config IE is used to configure a bandwidth part as defined in 38.211, section 4.2.2. Bandwidth parts are configured per serving cell for uplink (if the serving cell is configured with an uplink) and for downlink.

| BandwidthPart.Config information element |
|---|
| ```
-- ASN1START
-- TAG-BANDWIDTH-PART-START
BandwidthPart-Config ::=                        SEQUENCE {
    -- FFS: Conditions! What to do when certain fields or the entire bandwidth part is omitted?
Assume parameters of the carrier instead?
    --   Or use the initialBWP derived from SIB1 or ServingCellConfigCommon? Or make it
mandatory to provide at least one BWP.
    -- FFS: How can a BandiwdthPart be changed? Only via synchronousReconfiguration or also
without?
    -- NOTE: The changes in this section are based on RAN1 agreements (not from the official L1
parameter list):
    -- The bandwidth parts for downlink. (see 38.211, 38.213, section 12)
        downlinkBandwidthPartsToReleaseList          SEQUENCE (SIZE (1..maxNrofBandwidthParts)) OF
BandiwdthPartId           OPTIONAL,
        downlinkBandwidthPartsToAddModList           SEQUENCE (SIZE (1..maxNrofBandwidthParts)) OF
BandwidthPart             OPTIONAL,
    -- ID of the downlink bandwidth part to be used upon MAC-activation of an SCell. If not
provided, the UE uses the default BWP
        firstActiveDownlinkBwp-Id                    BandiwdthPartId   OPTIONAL, -- Cond SCellOnly
    -- Corresponds to L1 parameter 'default-DL-BWP'.
    -- ID of the downlink bandwidth part to be used upon expiry of txxx.
    -- This field is UE specific. When the field is absent the UE the initial BWP as default BWP.
    -- (see 38.211, 38.213, section 12)
    -- FFS: May the NW change the default BWP with a regular RRC reconfiguration or only with
Reconfiguration with sync?
    -- FFS: Whether to add a default uplink BWP
        defaultDownlinkBwp-Id                        BandiwdthPartId   OPTIONAL,
    -- The bandwidth parts for uplink. In case of TDD uplink- and downlink BWP with the same
bandwidthPartId are considered
        -- as a BWP pair and must have the same center frequency.
        uplinkBandwidthPartsToReleaseList            SEQUENCE (SIZE (1..maxNrofBandwidthParts)) OF
BandiwdthPartId           OPTIONAL,
        uplinkBandwidthPartsToAddModList             SEQUENCE (SIZE (1..maxNrofBandwidthParts)) OF
BandwidthPart             OPTIONAL,
    -- ID of the uplink bandwidth part to be used upon MAC-activation of an SCell. If not
provided, the UE uses the FFS: default BWP
        firstActiveUplinkBwp-Id                      BandiwdthPartId   OPTIONAL, -- Cond SCellOnly
    -- The duration in ms after which the UE falls back to the default Bandwidth Part. (see
38.321, section FFS_Section)
    -- The UE starts the timer when it switches its active downlink BWP to a downlink BWP other
than the default downlink BWP.
    -- The UE restarts the timer to the initial value when it successfully decodes a DCI to
schedule PDSCH(s) in its active downlink BWP.
    -- When the timer expires, the UE switches its active downlink BWP to the default downlink
(FFS: and uplink?) BWP.
    -- FFS: For TDD the UE switches also the paired uplink BWP to the one with the
defaultDownlinkBwp-Id.
    -- FFS: For FDD the UE switches the uplink BWP?????
    -- When the network releases the timer configuration, the UE stops the timer without
swithching to the default (FFS: and uplink?) BWP.
        bandwidthPartInactivityTimer                 SetupRelease { ENUMERATED {
                                                         FFS: Value range }} OPTIONAL,  --Need M
}
BandwidthPart ::=                                SEQUENCE {
        -- An identifier for this bandwidth part.
        -- Corresponds to L1 parameter 'UL-BWP-index'. (see 38.211, 38.213, section 12)
        bandwidthPartId                              BandiwdthPartId,
        -- Frequency domain location of this bandwidth part as a distance in number of PRBs in
relation to the reference PRB (PRB 0)
            -- of the associated carrier. Corresponds to L1 parameter 'DL-BWP-loc'. (see 38.211,
section FFS_Section).
            -- In case of TDD, a BWP-pair (UL BWP and DL BWP with the same bandwidthPartId) must have
the same location (see 38.211, section REF)
            -- FFS_Value: RAN1 seems to discuss the final range.
            location                                 INTEGER (0.. maxNrofPhysicalResourceBlocksTimes4)
``` |

-continued

| BandwidthPart.Config information element |
|---|

```
OPTIONAL,
        -- Bandwidth of this bandwidth part (see 38.211, section REF)
        bandwidth                               INTEGER (1.. maxNrofPhysicalResourceBlocks)
OPTIONAL,
        -- Subcarrier spacing to be used in this BWP. It is applied to at least PDCCH, PDSCH and
corresponding DMRS.
        -- The values provided here are converted into a subcarrier spacing as indicated in
38.211, Table 4.1-2.
        subcarrierSpacing                       ENUMERATED {n0, n1, n2, n3, n4}
    OPTIONAL,
        -- Indicates whether to use the extended cyclic prefix for this bandwidth part. If not
set, the UE uses the normal cyclic prefix.
        -- Normal CP is supported for all numerologies and slot formats. Extended CP is supported
only for 60 kHz subcarrier spacing.
        -- (see 38.211, section 4.2.2)
        cyclicPrefix                            ENUMERATED { extended }
    OPTIONAL,
        -- Frequency location of the uplink "direct current" frequency.
        -- Corresponds to L1 parameter 'UL-BWP-DC'. (see 38.211, section FFS_Section)
        directCurrentLocation                   INTEGER (0..3299)
        OPTIONAL, -- Cond UplinkOnly
}
BandwidthPartId ::=                             INTEGER (0..maxNrofBandwidthParts−1)
-- TAG-BANDWIDTH-PART-STOP
-- ASN1STOP
```

3GPP TS36.331 specified the interval of SPS as follows:
SPS-Config
The IE SPS-Config is used to specify the semi-persistent scheduling configuration.

| SPS-Config information element |
|---|

```
-- ASN1START
SPS-Config ::= SEQUENCE {
    semiPersistSchedC-RNTI              C-RNTI                          OPTIONAL,         -- Need OR
    sps-ConfigDL                        SPS-ConfigDL                    OPTIONAL,         -- Need ON
    sps-ConfigUL                        SPS-ConfigUL                    OPTIONAL          -- Need ON
}
SPS-Config-v1430 ::=   SEQUENCE {
    ul-SPS-V-RNTI-r14                   C-RNTI                          OPTIONAL,         -- Need OR
    sl-SPS-V-RNTI-r14                   C-RNTI                          OPTIONAL,         -- Need OR
    sps-ConfigUL-ToAddModList-r14       SPS-ConfigUL-ToAddModList-r14   OPTIONAL, -- Need ON
    sps-ConfigUL-ToReleaseList-r14      SPS-ConfigUL-ToReleaseList-r14  OPTIONAL, -- Need ON
    sps-ConfigSL-ToAddModList-r14       SPS-ConfigSL-ToAddModList-r14   OPTIONAL, -- Need ON
    sps-ConfigSL-ToReleaseList-r14      SPS-ConfigSL-ToReleaseList-r14  OPTIONAL -- Need ON
}
SPS-ConfigUL-ToAddModList-r14 ::= SEQUENCE (SIZE (1..maxConfigSPS-r14)) OF SPS-ConfigUL
SPS-ConfigUL-ToReleaseList-r14 ::= SEQUENCE (SIZE (1..maxConfigSPS-r14)) OF SPS-ConfigIndex-r14
SPS-ConfigSL-ToAddModList-r14 ::= SEQUENCE (SIZE (1..maxConfigSPS-r14)) OF SPS-ConfigSL-r14
SPS-ConfigSL-ToReleaseList-r14 ::= SEQUENCE (SIZE (1..maxConfigSPS-r14)) OF SPS-ConfigIndex-r14
SPS-ConfigDL ::=   CHOICE{
    release                             NULL,
    setup                               SEQUENCE {
        semiPersistSchedIntervalDL              ENUMERATED {
                                                    sf10, sf20, sf32, sf40, sf64, sf80,
                                                    sf128, sf160, sf320, sf640, spare6,
                                                    spare5, spare4, spare3, spare2,
                                                    spare1},
        numberOfConfSPS-Processes               INTEGER (1..8),
        n1PUCCH-AN-PersistentList               N1PUCCH-AN-PersistentList,
        ...,
        [[ twoAntennaPortActivated-r10          CHOICE {
                release                             NULL,
                setup                               SEQUENCE {
                    n1PUCCH-AN-PersistentListP1-r10 N1PUCCH-AN-PersistentList
                }
            }                                                                           OPTIONAL -- Need
ON
        ]]
    }
}
```

| SPS-Config information element |
|---|
| ```
SPS-ConfigUL ::=    CHOICE {
    release                         NULL,
    setup                           SEQUENCE {
        semiPersistSchedIntervalUL      ENUMERATED {
                                            sf10, sf20, sf32, sf40, sf64, sf80,
                                            sf128, sf160, sf320, sf640, sf1-v1430,
                                            sf2-v1430, sf3-v1430, sf4-v1430, sf5-v1430,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }   OPTIONAL,                                                   -- Need OP
        twoIntervalsConfig              ENUMERATED {true}               OPTIONAL, -- Cond TDD
        ...,
        [[ p0-PersistentSubframeSet2-r12    CHOICE {
                release                         NULL,
                setup                           SEQUENCE {
                    p0-NominalPUSCH-PersistentSubframeSet2-r12          INTEGER (-126..24),
                    p0-UE-PUSCH-PersistentSubframeSet2-r12              INTEGER (-8..7)
                }
            }                                                           OPTIONAL -- Need ON
        ]],
        [[ numberOfConfUlSPS-Processes-r13    INTEGER (1..8)            OPTIONAL -- Need OR
        ]],
        [[ fixedRV-NonAdaptive-r14            ENUMERATED {true}         OPTIONAL, -- Need
OR
            sps-ConfigIndex-r14               SPS-ConfigIndex-r14       OPTIONAL, -- Need
OR
            semiPersistSchedIntervalUL-v1430  ENUMERATED {
                                                sf50, sf100, sf200, sf300, sf400, sf500,
                                                sf600, sf700, sf800, sf900, sf1000, spare5,
                                                spare4, spare3, spare2, spare1} OPTIONAL  -- Need
OR
        ]]
    }
}
SPS-ConfigSL-r14 ::= SEQUENCE {
    sps-ConfigIndex-r14             SPS-ConfigIndex-r14,
    semiPersistSchedIntervalSL-r14  ENUMERATED {
                                        sf20, sf50, sf100, sf200, sf300, sf400,
                                        sf500, sf600, sf700, sf800, sf900, sf1000,
                                        spare4, spare3, spare2, spare1}
}
SPS-ConfigIndex-r14 ::=   INTEGER (1..maxConfigSPS-r14)
N1PUCCH-AN-PersistentList ::=          SEQUENCE (SIZE (1..4)) OF INTEGER (0..2047)
-- ASN1STOP
``` |

| SPS-Config field descriptions |
|---|
| fixedRV-NonAdaptive |
| If this field is present and skipUplinkTxSPS is configured, non-adaptive retransmissions on configured uplink grant uses redundancy version 0, otherwise the redundancy version for each retransmission is updated based on the sequence of redundancy versions as described in TS 36.321 [6]. |
| implicitReleaseAfter |
| Number of empty transmissions before implicit release, see TS 36.321 [6, 5.10.2]. Value e2 corresponds to 2 transmissions, e3 corresponds to 3 transmissions and so on. If skipUplinkTxSPS is configured, the UE shall ignore this field. |
| n1PUCCH-AN-PersistentList, n1PUCCH-AN-PersistentListP1 |
| List of parameter: $n_{PUCCH}^{(1, p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for downlink Semi-Persistent Scheduling, see TS 36.321 [6]. |

| SPS-Config field descriptions |
| --- |
| numberOfConfUlSPS-Processes |
| The number of configured HARQ processes for uplink Semi-Persistent Scheduling, see TS 36.321 [6]. E-UTRAN always configures this field for asynchronous UL HARQ. Otherwise it does not configure this field. |
| p0-NominalPUSCH-Persistent |
| Parameter: $P_{O\_NOMINAL\_PUSCH}$ (0). See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1. |
| p0-NominalPUSCH-PersistentSubframeSet2 |
| Parameter: $P_{O\_NOMINAL\_PUSCH}$ (0). See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2. |
| p0-UE-PUSCH-Persistent |
| Parameter: $P_{O\_UE\_PUSCH}$ (0). See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1. |
| p0-UE-PUSCH-PersistentSubframeSet2 |
| Parameter: $P_{O\_UE\_PUSCH}$ (0). See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2. |
| semiPersistSchedC-RNTI |
| Semi-persistent Scheduling C-RNTI, see TS 36.321 [6]. |
| semiPersistSchedIntervalDL |
| Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| semiPersistSchedIntervalSL |
| Semi-persistent scheduling interval in sidelink, see TS 36.321 [6]. Value in number of sub-frames. Value sf20 corresponds to 20 sub-frames, sf50 corresponds to 50 sub-frames and so on. |
| semiPersistSchedIntervalUL |
| Semi-persistent scheduling interval in uplink, see TS 36.321 [6]. Value in number of sub-frames. Value sf10 corresponds to 10 sub-frames, sf20 corresponds to 20 sub-frames and so on. For TDD, when the configured Semi-persistent scheduling interval is greater than or equal to 10 sub-frames, the UE shall round this parameter down to the nearest integer (of 10 sub-frames), e.g. sf10 corresponds to 10 sub-frames, sf32 corresponds to 30 sub-frames, sf128 corresponds to 120 sub-frames. If semiPersistSchedIntervalUL-v1430 is configured, the UE only considers this extension (and ignores semiPersistSchedIntervalUL i.e. without suffix). |
| sl-SPS-V-RNTI |
| SL Semi-Persistent Scheduling V-RNTI for V2X sidelink communication, see TS 36.321 [6]. |
| sps-ConfigIndex |
| Indicates the index of one of multiple SL/UL SPS configurations. |
| sps-ConfigSL-ToAddModList |
| Indicates the SL SPS configurations to be added or modified, identified by SPS-ConfigIndex. |
| sps-ConfigSL-ToReleaseList |
| Indicates the SL SPS configurations to be released, identified by SPS-ConfigIndex. |

-continued

| SPS-Config field descriptions |
| --- |
| sps-ConfigUL-ToAddModList |
| Indicates the UL SPS configurations to be added or modified, identified by SPS-ConfigIndex.<br>sps-ConfigUL-ToReleaseList |
| Indicates the UL SPS configurations to be released, identified by SPS-ConfigIndex.<br>twoIntervalsConfig |
| Trigger of two-intervals-Semi-Persistent Scheduling in uplink. See TS 36.321 [6, 5.10]. If this field is present and the configured Semi-persistent scheduling interval greater than or equal to 10 sub-frames, two-intervals-SPS is enabled for uplink. Otherwise, two-intervals-SPS is disabled.<br>ul-SPS-V-RNTI |
| UL Semi-Persistent Scheduling V-RNTI for UEs capable of multiple uplink SPS configurations and which support V2X communication, see TS 36.321 [6]. |

According to 3GPP TS 38.300, the concept of bandwidth part (BWP) is introduced in New Radio (NR) so that reception and transmission of bandwidth of a UE need not be as large as the bandwidth part of a cell serving the UE and can be adjusted.

In NR, the carrier bandwidth could be much larger (e.g. up to 400 MHz) as compared to LTE (e.g. up to 20 MHz). As a UE may not be capable to support the full bandwidth of a carrier, the concept of bandwidth part (BWP) is introduced. A UE is not required to receive any DL signals outside a frequency range which is configured to the UE. One or multiple BWP configurations for each component carrier can be semi-statically signalled to a UE. Configuration of a BWP may include information to indicate numerology (sub-carrier spacing), frequency location (e.g. center frequency) and bandwidth (e.g. number of PRBs). Each BWP is associated with a specific numerology (sub-carrier spacing, CP type). A UE expects at least one DL BWP and one UL BWP being active among the set of configured BWPs for a given time instant. A UE is only assumed to receive/transmit within active DL/UL BWP(s) using the associated numerology. There is an initial active DL/UL BWP pair to be valid for a UE until the UE is explicitly (re)configured with BWP(s) during or after RRC connection is established.

In Rel-15, for a UE, there is at most one active DL BWP and at most one active UL BWP at a given time for a serving cell. For each serving cell of the UE, one or more DL BWPs and one or more UL BWPs can be configured by dedicated RRC for a UE. NR supports the case that a single scheduling downlink control information (DCI) can switch the UE's active BWP from one to another (of the same link direction) within a given serving cell. Multiple active DL/UL BWPs may be supported in the future release.

RAN1 has further agreed that a dedicated timer is supported for timer-based active DL BWP (or DL/UL BWP pair) switching to the default DL BWP (or default DL/UL BWP pair). According to RAN1 agreements, for paired spectrum (e.g. Frequency-division duplex, FDD), the UE starts the dedicated timer when it switches its active DL BWP to a DL BWP other than the default DL BWP, and the UE restarts the dedicated timer to the initial value when it successfully decodes a DCI to schedule PDSCH(s) in its active DL BWP. When the dedicated timer expires, the UE switches its active DL BWP to the default DL BWP regardless what BWP is using as active BWP before. For unpaired spectrum (e.g. Time-division duplex, TDD), one DL BWP and one UL BWP form a pair, and are switched jointly. For unpaired spectrum, the UE restarts the dedicated timer to the initial value when it successfully decodes a DCI to schedule PUSCH(s) in its active DL or UL BWP pair. The default DL BWP could be optionally configured to the UE for a serving cell (e.g. PCell and/or SCell). For PCell, if no default DL BWP is configured, the default DL BWP is the initial active DL BWP (i.e. the BWP used to perform initial access); and if a default DL BWP is configured, the default DL BWP could be the same or different from the initial active DL BWP. For SCell, RRC signaling for SCell configuration/reconfiguration indicates the first active DL BWP and/or the first active UL BWP, which will be considered as active when the SCell is activated. The default DL BWP (if configured) could be the same or different from the first active DL BWP (i.e. initial DL BWP).

The purpose of introducing the dedicated timer (referred to as "BWP inactivity timer" or "BWP timer" below) could be for reducing UE power-consumption. When there is traffic on a serving cell, network (NW) may schedule the UE and switch the UE's active BWP from default BWP to another (wide-bandwidth) BWP e.g. for increasing data throughput. The BWP timer will thus be started and restarted accordingly. When there is no traffic for a while, the timer expires and UE switches active BWP back to the default one without NW signaling. The default BWP could be a narrow-bandwidth BWP, and the UE only needs to monitor PDCCH occasions on the default BWP with reduced power-consumption. NW can even configure the default BWP with less frequent PDCCH occasions for further reducing UE's power-consumption.

RAN2 agreed that Type 1 resource configuration and RRC configuration for semi-persistent scheduling (SPS) can be configured per BWP (as discussed in the RAN2#100 Chairman's note). Based on the RAN2#100 Chairman's note, the UE should clear all configured resources for SPS within a BWP when the BWP is deactivated. In addition, RAN1 agreed that the maximum length of BWP timer is approximately 50 ms (as discussed in the RAN2#91 Chairman's note). Possibly, the length of SPS interval could be less than or larger than the length of BWP timer if NR reuses parameters of LTE for SPS. In the following, Type 1 (resource) configuration could be used for uplink transmission (e.g. configured grant Type 1), and RRC configuration for SPS could be used for uplink transmission (e.g. configured grant Type 2) or downlink reception (e.g. configured DL assignment).

Currently, the NR MAC specification (3GPP TS 38.321) specified that UE restarts BWP timer for a BWP when dynamic scheduling (e.g. by PDCCH indicating downlink assignment or an uplink grant) for the BWP is received. In other words, it is not clear if UE should restart BWP timer at a timing where is the opportunity for transmission or reception for the configured resources. If this is not specified, the UE may switch back to default BWP while it is transmitting or receiving based on the configured resources. If this is the case, the network needs to send DCI to (re-)activate or (re-)initialise the configured resources on the BWP every time when UE switches back to the default BWP. Thus, this situation results in signalling overhead.

Figure 7:
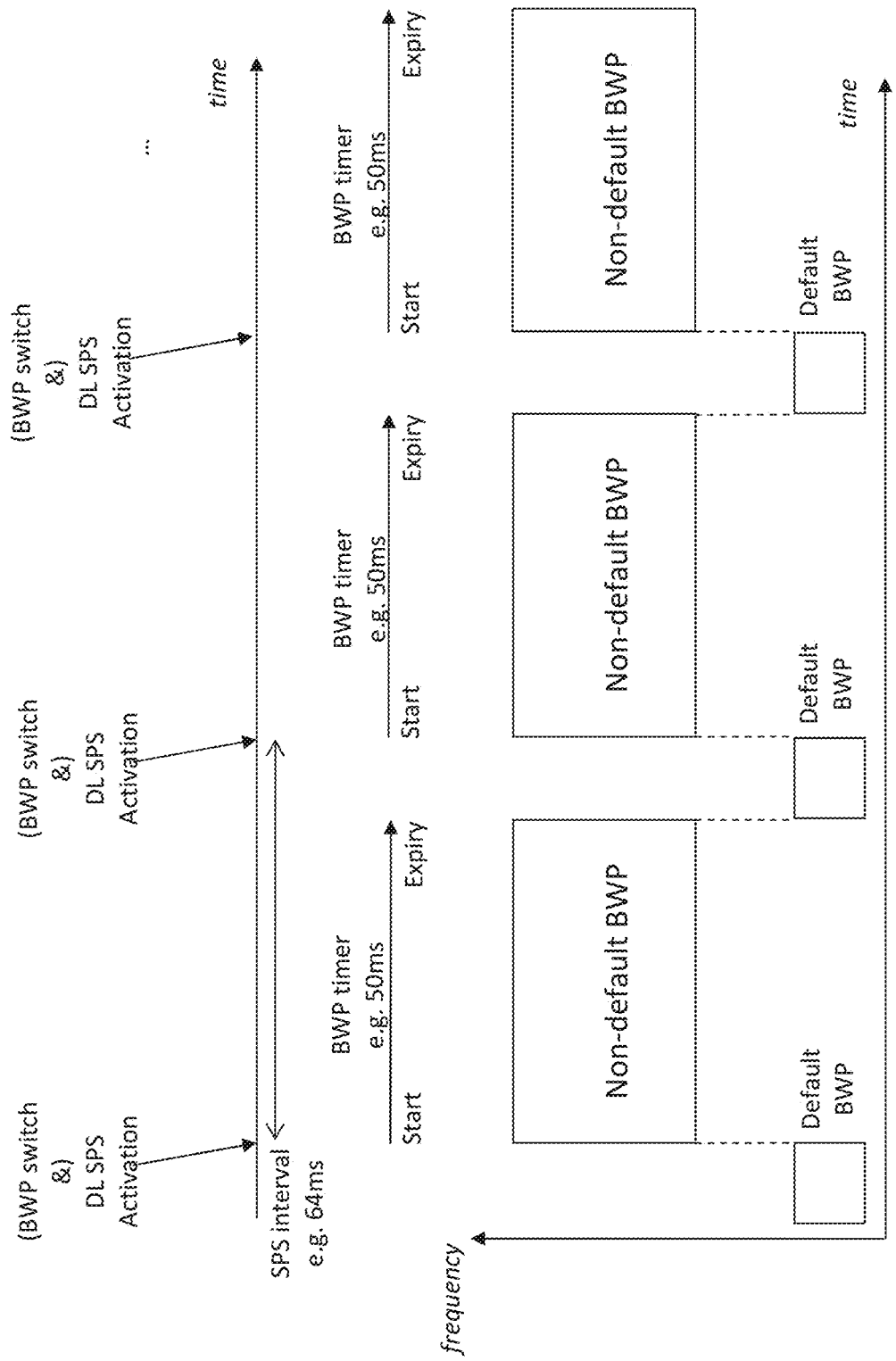
FIG. 7 is a diagram according to one embodiment.
Figure 8:
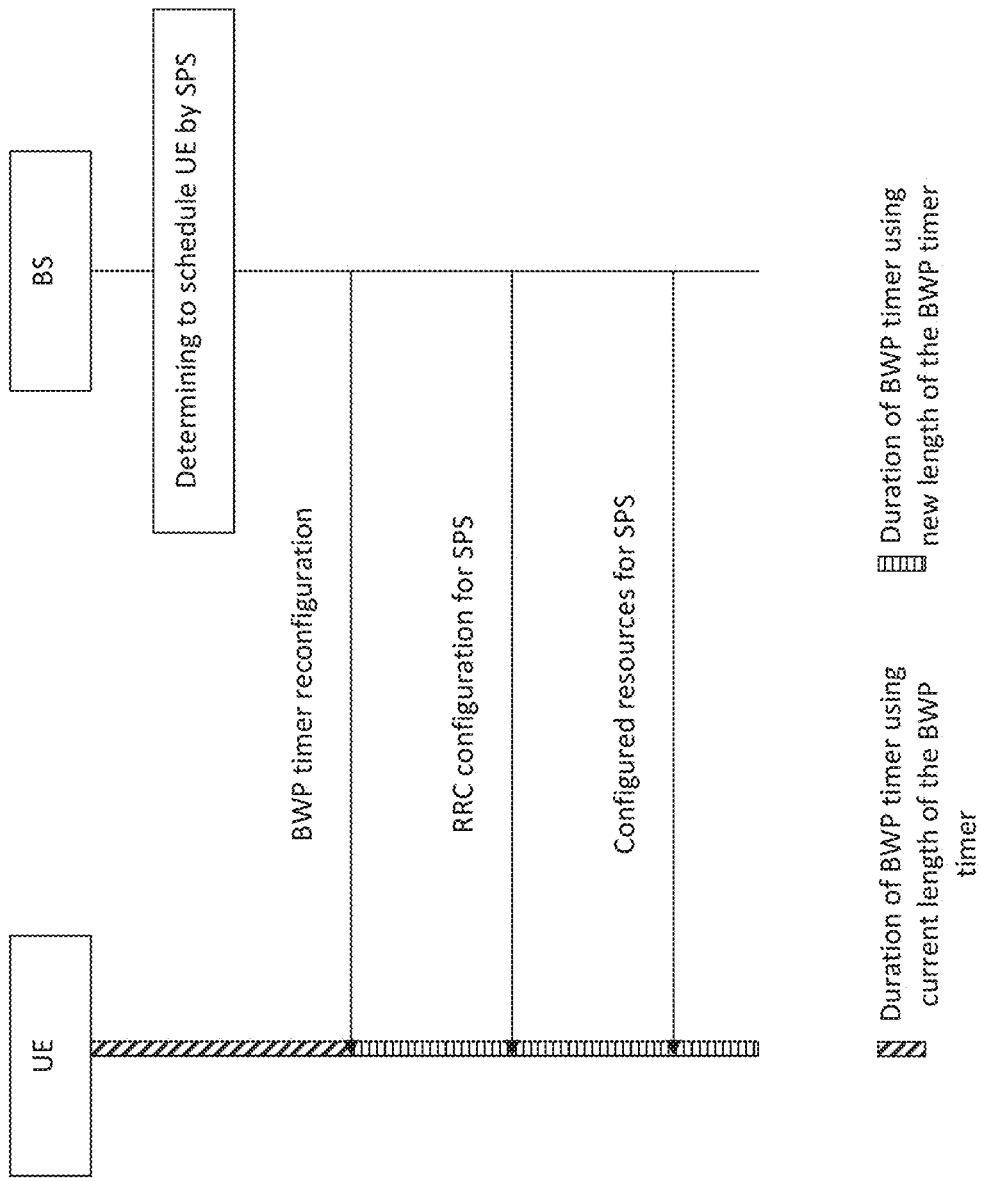
FIG. 8 is a diagram according to one embodiment.
Figure 9:
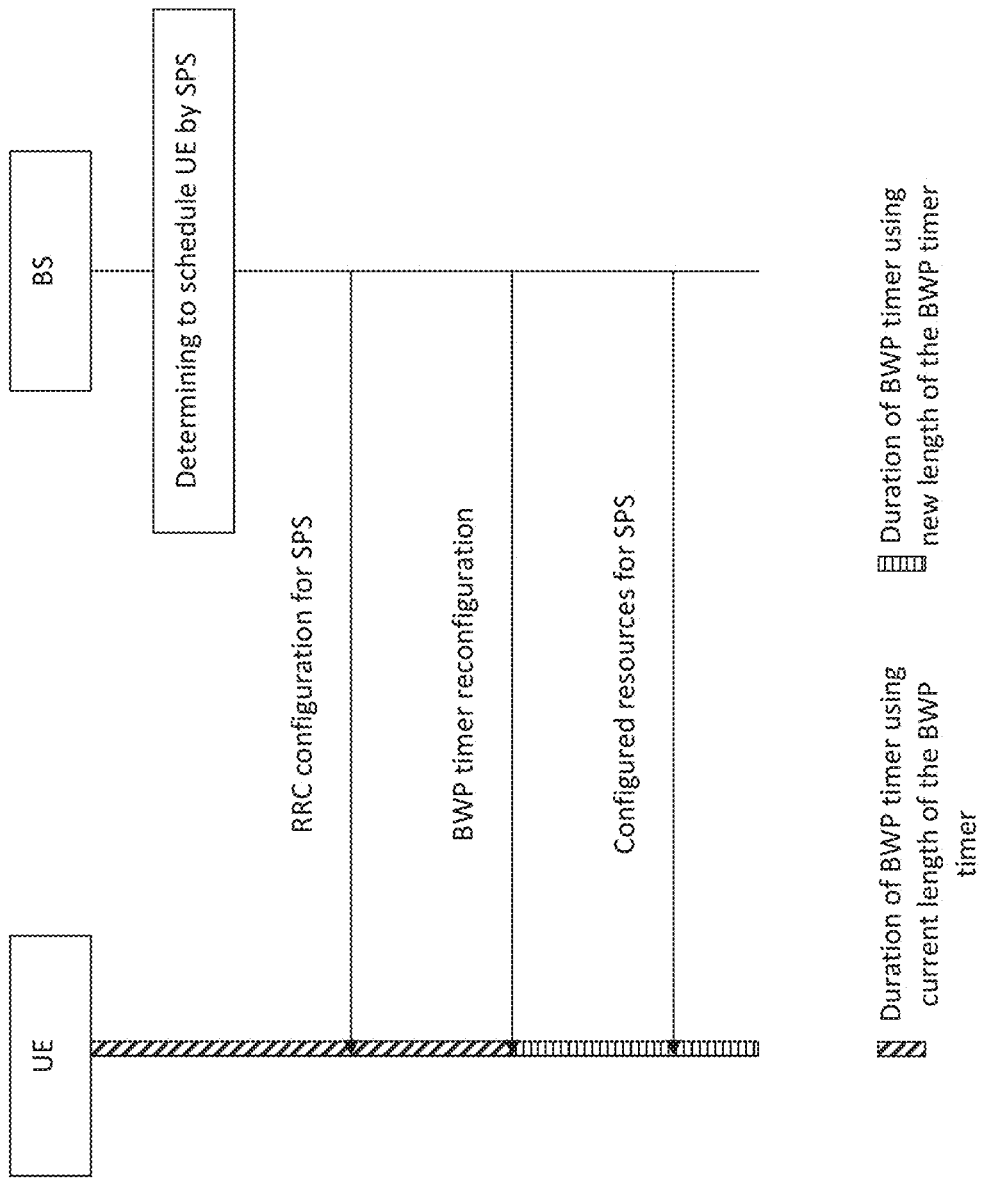
FIG. 9 is a diagram according to one embodiment.
Figure 10:
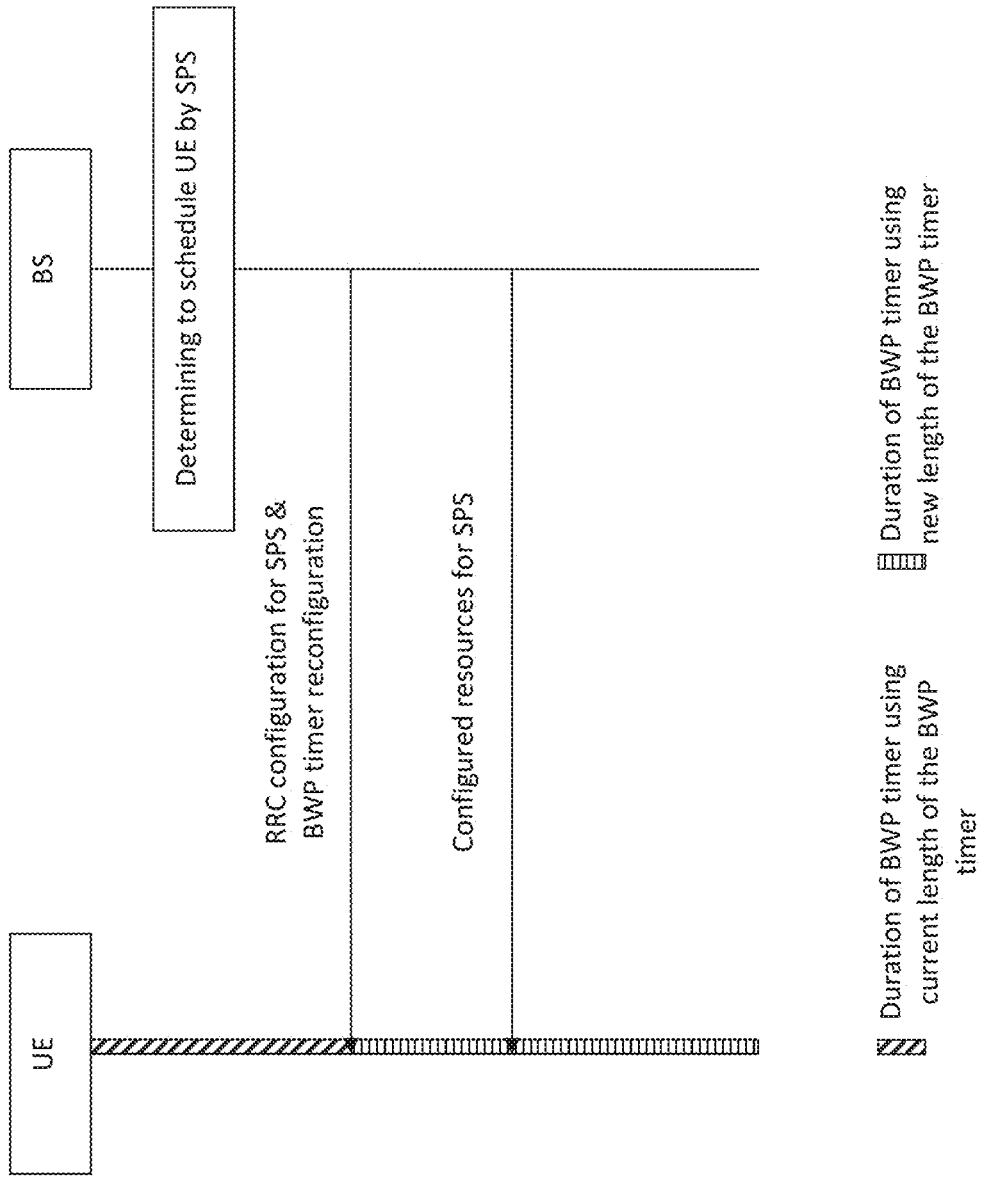
FIG. 10 is a diagram according to one embodiment.
Figure 11:
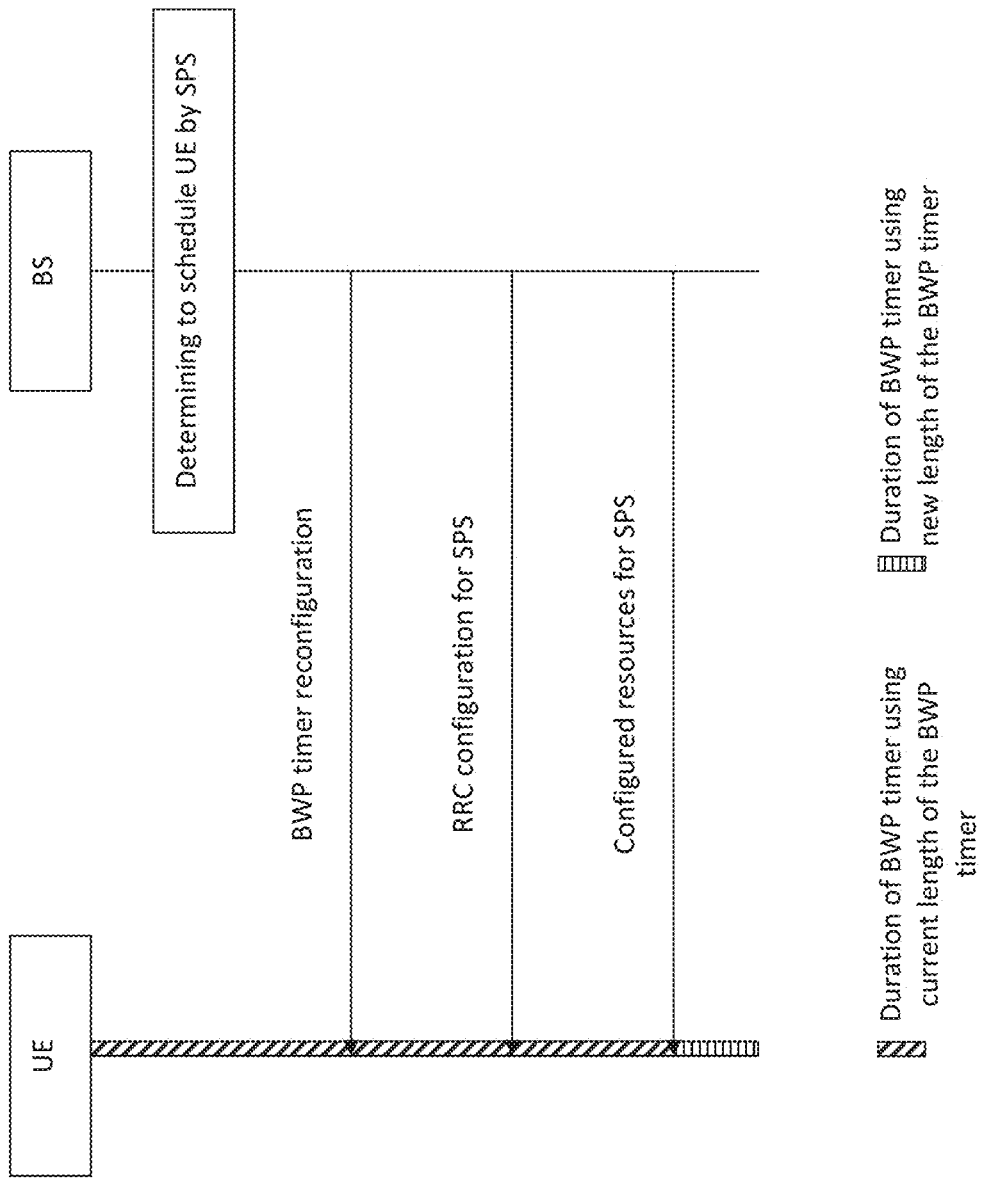
FIG. 11 is a diagram according to one embodiment.
Figure 12:
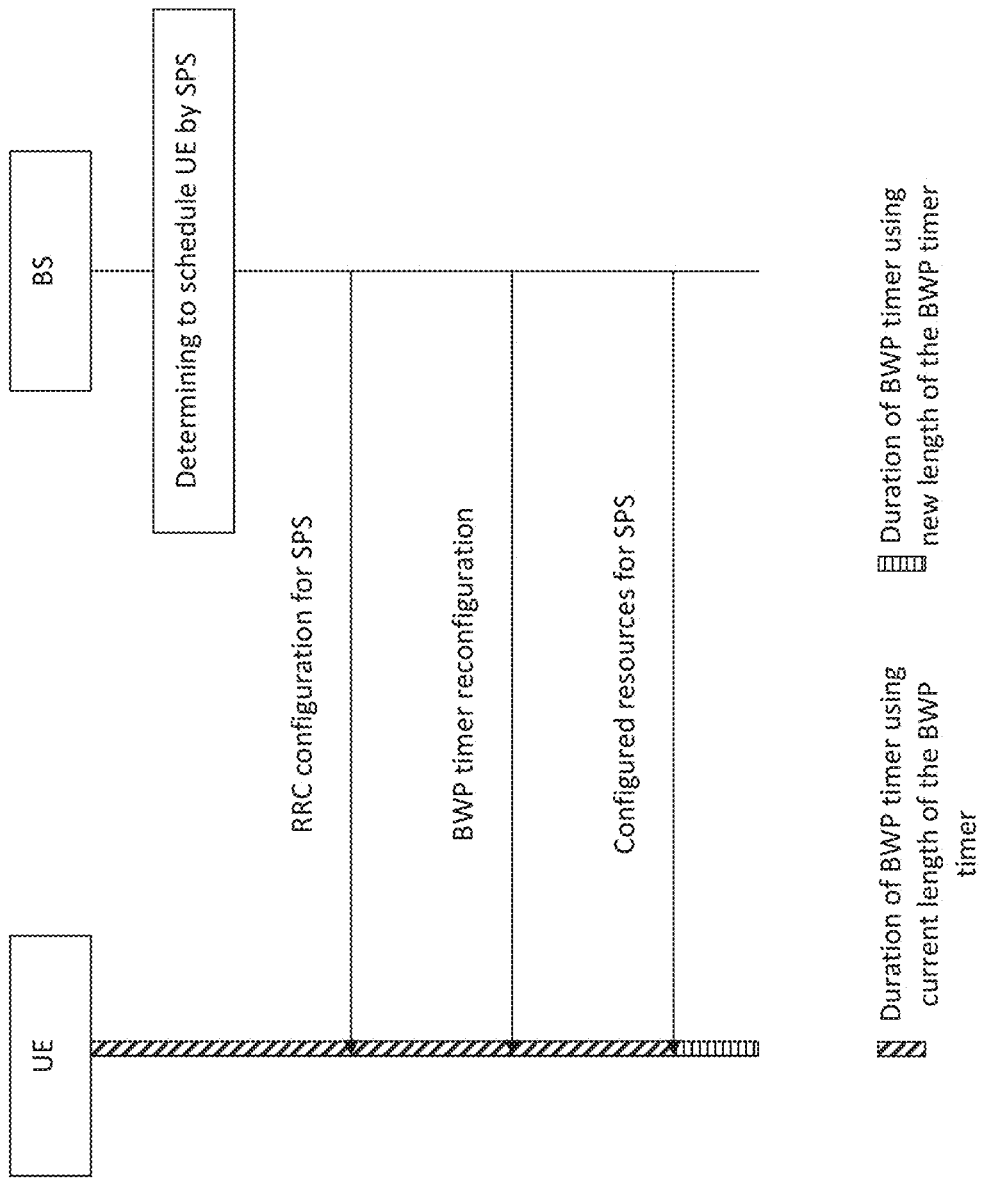
FIG. 12 is a diagram according to one embodiment.
Figure 13:
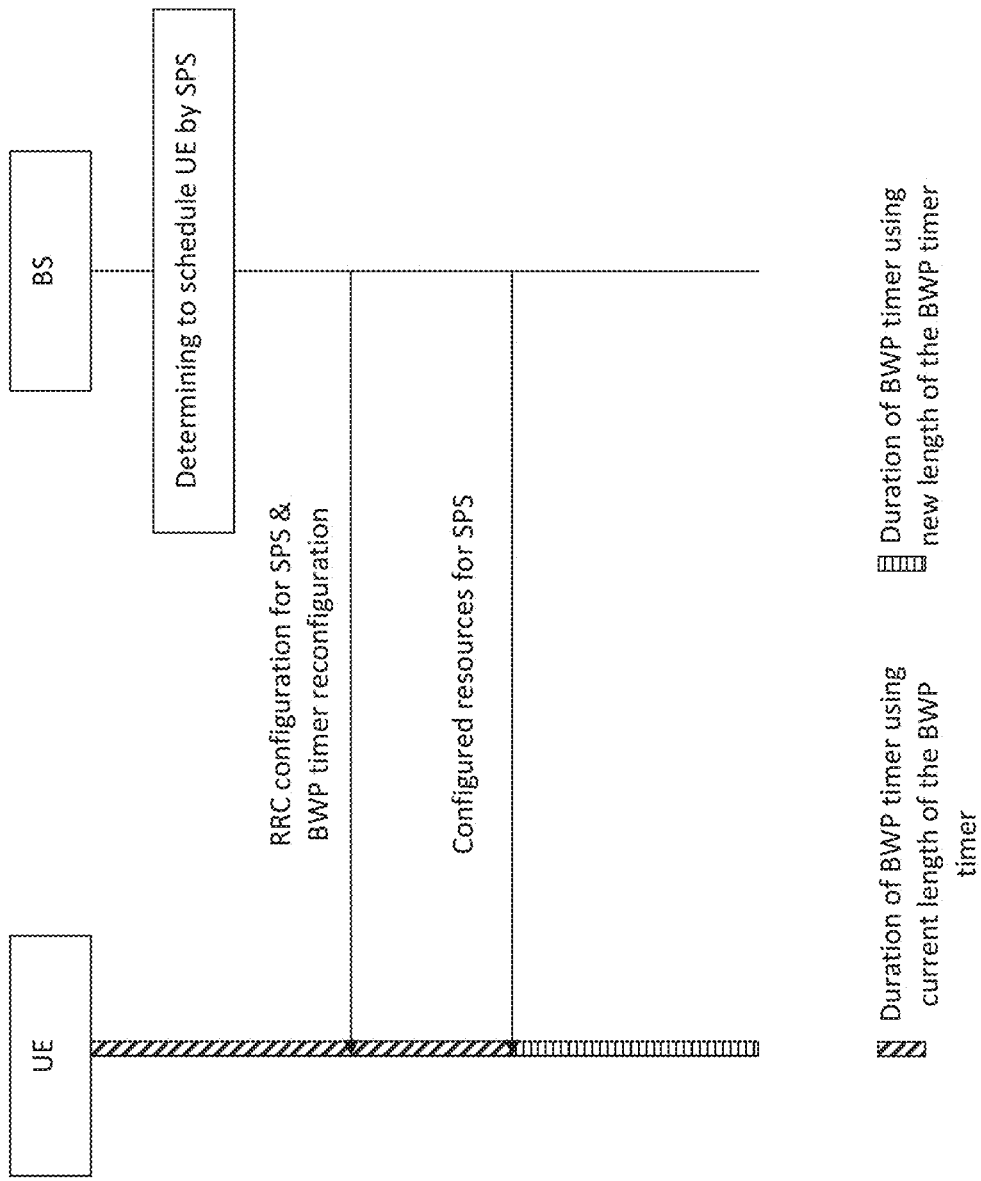
FIG. 13 is a diagram according to one embodiment.
Figure 14:
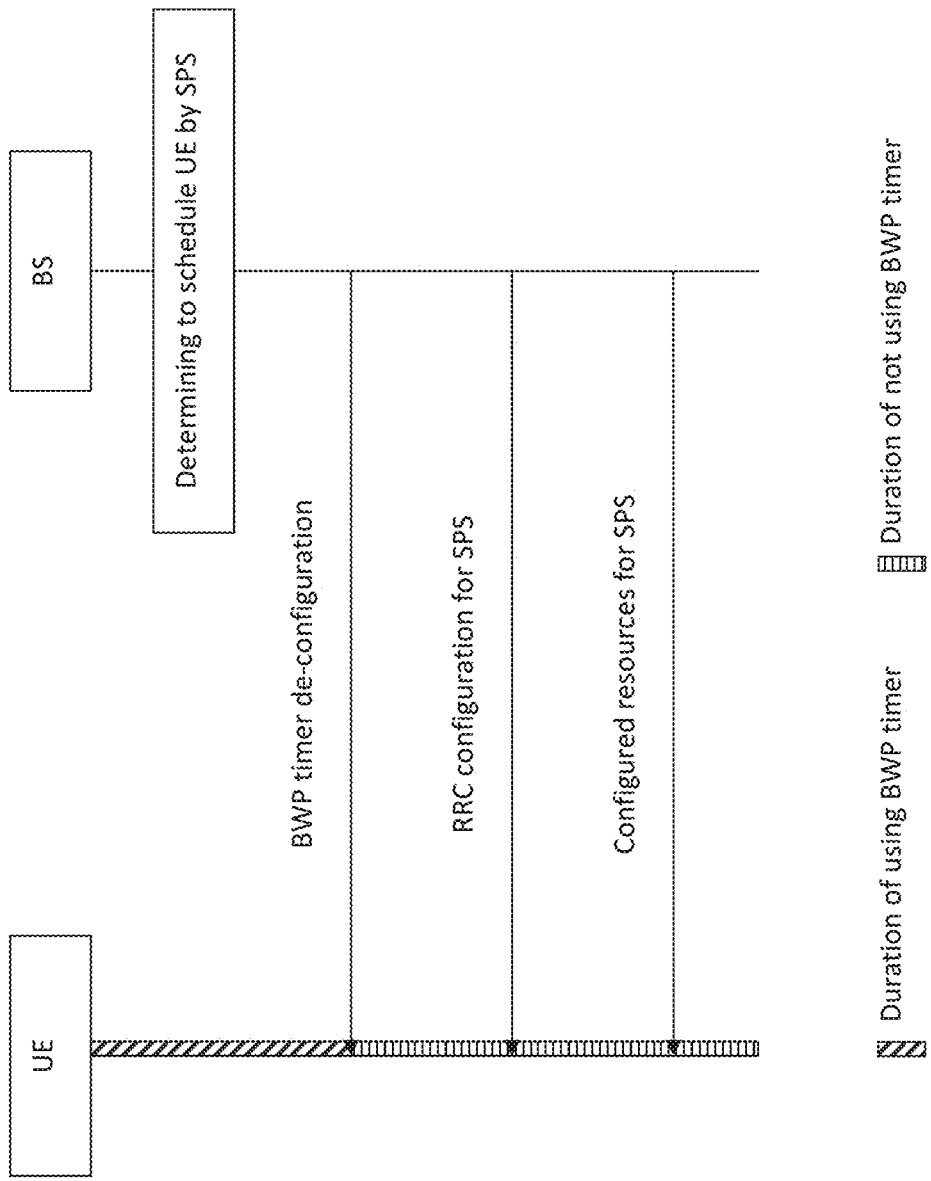
FIG. 14 is a diagram according to one embodiment.
Figure 15:
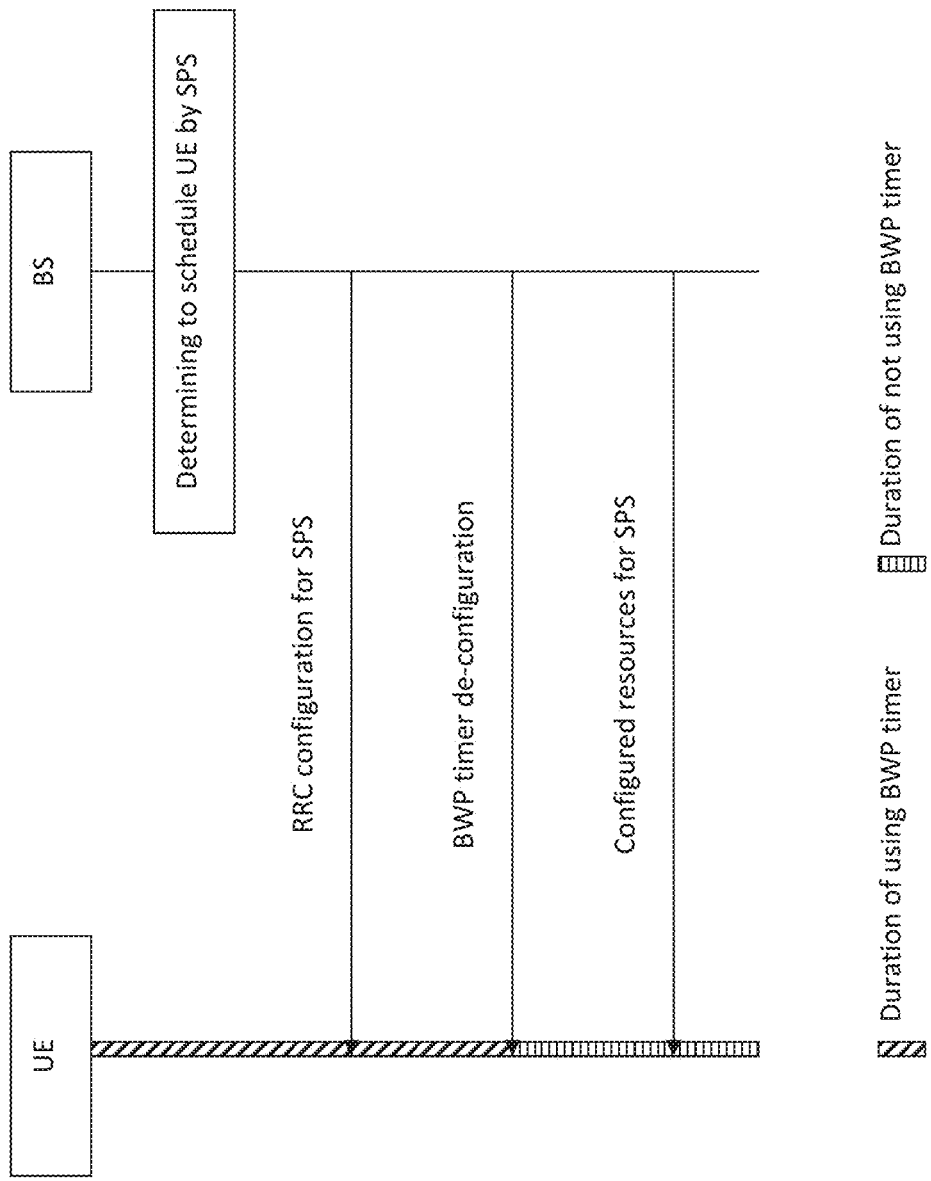
FIG. 15 is a diagram according to one embodiment.
Figure 16:
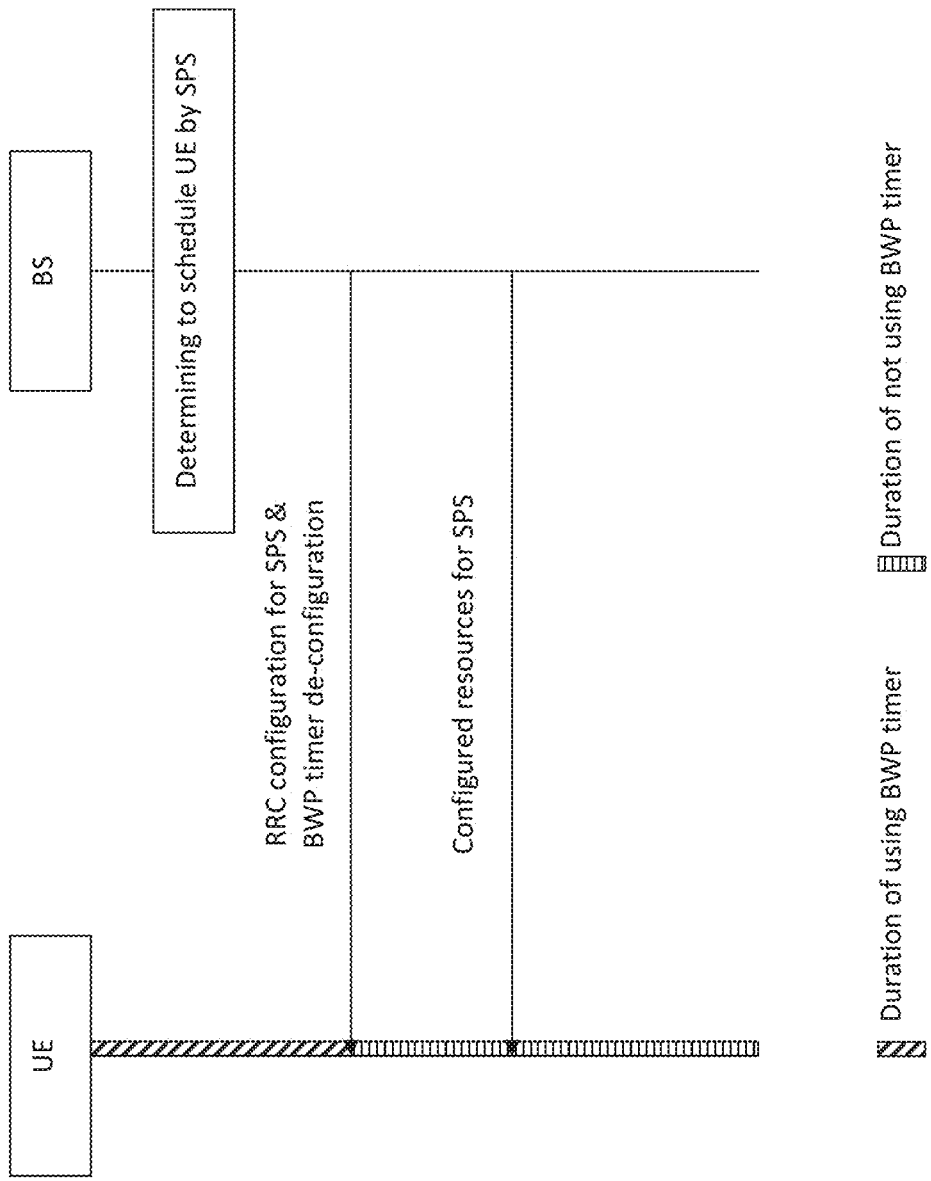
FIG. 16 is a diagram according to one embodiment.
Figure 17:
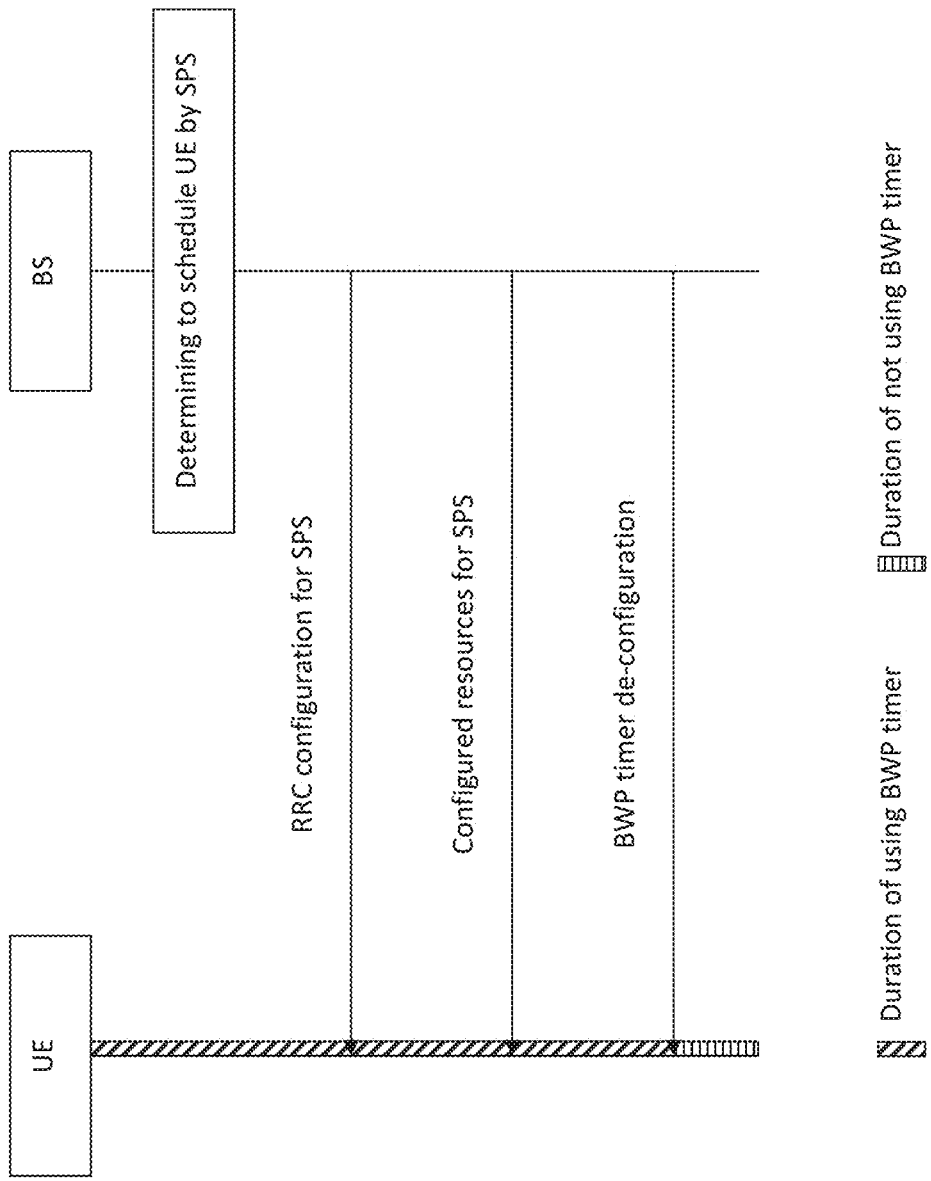
FIG. 17 is a diagram according to one embodiment.

FIG. 6 could illustrate the case that the length of SPS interval (in downlink) is less than the length of the BWP timer, and FIG. 7 could illustrate the case that the length of SPS interval (in downlink) is larger than the length of the BWP timer. In the figures, the configured DL assignments mean configured resources for reception. A simple way to avoid BWP timer expiry could be that the UE restarts BWP timer at the timing where is the opportunity for transmission or reception for the configured resources. However, this may not be usable if the length of SPS interval is larger than the length of BWP timer. As shown in FIG. 7, the UE has no chance to restart BWP timer if the opportunity for DL assignment occurs after expiry of BWP timer and no dynamic scheduling is received during the SPS interval.

If each (non-default) BWP can be configured with a BWP timer (i.e. one BWP timer per BWP), whether a UE should run a BWP timer for a specific BWP can be configured by the network. By this way, the network can determine not to configure a BWP timer for a BWP on which configured resources are allocated. In UE aspect, the UE does not start or restart the BWP timer for the BWP when it switches to the BWP or receives the dynamic scheduling for the BWP. This solution could be applied by the UE no matter whether the BWP timer is configured or not. If there is a need to switch back to default BWP, the network can use DCI to indicate the UE to switch back to default BWP.

In one embodiment, the network could configure the UE with a first BWP. The network could configure the UE with a second BWP. The first BWP could belong to a serving cell. The second BWP could belong to the serving cell or another serving cell. The network could configure the UE to use a (common) BWP timer for the serving cell or separate BWP timers for different BWPs (in the serving cell). The UE may not be configured with Type 1 resource configuration on the first BWP. The UE may not be configured with RRC configuration for SPS on the first BWP. The UE could be configured with RRC configuration for SPS on the first BWP but could not be allocated with configured resources for SPS on the first BWP. The UE could be configured with Type 1 resource configuration on the second BWP. The UE could be configured with RRC configuration for SPS on the second BWP. The UE could be allocated with configured resources (e.g. Type 1 resources or SPS resources) on the second BWP. The configured resources on the second BWP could be activated or deactivated. The configured resources on the second BWP could be initialised or released.

In one embodiment, the network could configure the UE to run a first BWP timer for the first BWP. The network could configure the UE to run a second BWP timer for the second BWP. The length of the first BWP timer could be (configured with) a value which is not infinite or zero. The length of the second BWP timer could be (configured with) a first value which is not infinite or zero. The length of the second BWP timer could be (configured with or pre-configured with) a second value which is infinite or larger than the first value.

In one embodiment, the UE could start or restart the first BWP timer and controls period of the first BWP timer based on the value when it switches to the first BWP (from a default BWP or the second BWP) or receives the dynamic scheduling for the first BWP. The UE could start or restart the second BWP timer, which does not expire (due to infinite length of the second BWP timer), and controls period of the second BWP timer based on the second value when it switches to the second BWP (from a default BWP or the first BWP) or receives the dynamic scheduling for the second BWP.

In one embodiment, the UE could start or restart the second BWP timer when it switches to the second BWP (from a default BWP or the first BWP) or receives the dynamic scheduling for the second BWP. In this situation, the UE could restart the second BWP timer on a timing where is the opportunity for transmission or reception for the configured resources on the second BWP. The UE could start or restart the second BWP timer and control period of the second BWP timer based on the first value when it is not configured with the Type 1 resource configuration or the RRC configuration for SPS on the second BWP or it is configured to release the Type 1 resource configuration or the RRC configuration for SPS on the second BWP (via e.g. RRC signalling, MAC control element or physical signalling). The UE could start or restart the second BWP timer and control period of the second BWP timer based on the first value if it is not configured with the Type 1 resource configuration or the RRC configuration for SPS on the second BWP (via e.g. RRC signalling, MAC control element or physical signalling). In this situation, the second BWP could be active.

In one embodiment, the UE could start or restart the second BWP timer and control period of the second BWP timer based on the first value when it is not configured with the configured resources on the second BWP or it is configured to release or deactivate the configured resources on the second BWP (via e.g. RRC signalling, MAC control element or physical signalling). The UE could start or restart the second BWP timer and control period of the second BWP timer based on the first value if it is not configured with the configured resources on the second BWP. In this situation, the second BWP could be active.

In one embodiment, the UE could start or restart the second BWP timer and control period of the second BWP timer based on the second value when it is configured with the Type 1 resource configuration or the RRC configuration for SPS on the second BWP (via e.g. RRC signalling, MAC control element or physical signalling). The UE could start or restart the second BWP timer and control period of the second BWP timer based on the second value if it is configured with the Type 1 resource configuration or the RRC configuration for SPS on the second BWP (via e.g. RRC signalling, MAC control element or physical signalling). In this situation, the second BWP could be active.

In one embodiment, the UE could start or restart the second BWP timer and control period of the second BWP timer based on the second value when it is configured to (re-)initialise or (re-)activate the configured resources on the second BWP (via e.g. RRC signalling, MAC control element or physical signalling). The UE could start or restart the second BWP timer and control period of the second BWP timer based on the second value if it is configured with the configured resources on the second BWP. The UE could restart the second BWP timer on a timing where is the opportunity for transmission or reception for the configured resources.

In one embodiment, the UE could stop the first BWP timer when it switches back to a default BWP or the second BWP (from the first BWP). The UE could stop the second BWP timer when it switches back to a default BWP or the first BWP (from the second BWP).

In one embodiment, the UE could switch back to a default BWP (from the first BWP) upon expiry of the first BWP timer. The UE may not switch back to the default BWP (from the second BWP) based on the second BWP timer. The UE could switch back to a default BWP (from the first BWP or the second BWP) upon reception of indication indicating switching to a default BWP from the network (via e.g. RRC signalling, MAC control element or physical signalling).

In one embodiment, the network could configure the UE to run a BWP timer for the first BWP. The network could configure the UE not to run any BWP timer for the second BWP. The length of the BWP timer could be a value which is not infinite or zero.

In one embodiment, the UE could start or restart the BWP timer and controls period of the BWP timer based on the value when it switches to the first BWP (from a default BWP or the second BWP) or receives the dynamic scheduling for the first BWP. The UE may not start or restart the BWP timer when it switches to the second BWP (from a default BWP or the first BWP) or receives the dynamic scheduling for the second BWP.

In one embodiment, the UE could stop the BWP timer when it switches back to a default BWP or the second BWP (from the first BWP). The UE could switch back to a default BWP (from the first BWP) upon expiry of the BWP timer. The UE could switch back to a default BWP (from the first BWP or the second BWP) upon reception of indication indicating switching to the default BWP from the network (via e.g. RRC signalling, MAC control element or physical signalling).

In one embodiment, the network could configure the UE to run a BWP timer for the first BWP and the second BWP (i.e. to run the BWP timer for the serving cell). The length of the BWP timer could be (configured with) a first value which is not infinite or zero. The length of the BWP timer could be (configured with or pre-configured with) a second value which is infinite or larger than the first value. The length of the BWP timer with the first value could be less than the length of SPS interval. The length of the BWP timer with the second value could be larger than (or equal to) the length of SPS interval.

In one embodiment, the UE could start or restart the BWP timer and control period of the BWP timer based on the first value when it switches to the first BWP (from a default BWP or the second BWP) or receives the dynamic scheduling for the first BWP. The UE could start or restart the BWP timer and control period of the BWP timer based on the first value or the second value when it switches to the second BWP (from a default BWP or the first BWP) or receives the dynamic scheduling for the second BWP.

In one embodiment, the UE could start or restart the BWP timer and control period of the BWP timer based on the first value when it is not configured with the Type 1 resource configuration or the RRC configuration for SPS on the second BWP or it is configured to release the Type 1 resource configuration or the RRC configuration for SPS on the second BWP (via e.g. RRC signalling, MAC control element or physical signalling). The UE could start or restart the BWP timer and control period of the BWP timer based on the first value if it is not configured with the Type 1 resource configuration or the RRC configuration for SPS on the second BWP (via e.g. RRC signalling, MAC control element or physical signalling). In this situation, the second BWP could be active.

In one embodiment, the UE could start or restart the BWP timer and control period of the BWP timer based on the first value when it is not configured with the configured resources on the second BWP or it is configured to release or deactivate the configured resources on the second BWP (via e.g. RRC signalling, MAC control element or physical signalling). The UE could start or restart the BWP timer and control period of the BWP timer based on the first value if it is not configured with the configured resources on the second BWP. In this situation, the second BWP could be active.

In one embodiment, the UE could start or restart the BWP timer and control period of the BWP timer based on the second value when it is configured with the Type 1 resource configuration or the RRC configuration for SPS on the second BWP (via e.g. RRC signalling, MAC control element or physical signalling). The UE could start or restart the BWP timer and control period of the BWP timer based on the second value if it is configured with the Type 1 resource configuration or the RRC configuration for SPS on the second BWP (via e.g. RRC signalling, MAC control element or physical signalling). In this situation, the second BWP could be active.

In one embodiment, the UE could start or restart the BWP timer and control period of the BWP timer based on the second value when it is configured to (re-)initialise or (re-)activate the configured resources on the second BWP (via e.g. RRC signalling, MAC control element or physical signalling). The UE could start or restart the BWP timer and control period of the BWP timer based on the second value if it is configured with the configured resources on the second BWP. The UE could restart the BWP timer on a timing where is the opportunity for transmission or reception for the configured resources.

In one embodiment, the UE could stop the BWP timer when it switches back to a default BWP (from the first BWP or the second BWP). The UE could switch back to a default BWP (from the first BWP or the second BWP) upon expiry of the BWP timer. The UE could switch back to a default BWP (from the first BWP or the second BWP) upon reception of indication indicating switching to the default BWP from the network (via e.g. RRC signalling, MAC control element or physical signalling).

In one embodiment, the network could configure the UE to run a BWP timer for the first BWP and the second BWP (i.e. to run the BWP timer for the serving cell). The length of the BWP timer could be (configured with) a value which is not infinite or zero. The UE could start or restart the BWP timer and control period of the BWP timer based on the value when it switches to the first BWP (from a default BWP or the second BWP) or receives the dynamic scheduling for the first BWP.

In one embodiment, the UE may not start or restart the BWP timer if it is configured with the Type 1 resource configuration or the RRC configuration for SPS on the second BWP. In this situation, the second BWP could be active.

In one embodiment, the UE may not start or restart the BWP timer when it switches to the second BWP (from a default BWP or the first BWP) or receives the dynamic scheduling for the second BWP. In this situation, the UE could be configured with the Type 1 resource configuration or the RRC configuration for SPS on the second BWP (via e.g. RRC signalling, MAC control element or physical signalling).

In one embodiment, the UE could stop the BWP timer when the UE is configured with the Type 1 resource configuration or the RRC configuration for SPS on the second BWP (via e.g. RRC signalling, MAC control element or physical signalling). In this situation, the second BWP could be active.

In one embodiment, the UE could start or restart the BWP timer and control period of the BWP timer based on the value when it switches to the second BWP (from a default BWP or the first BWP) or receives the dynamic scheduling for the second BWP. In this situation, the UE could not be configured with the Type 1 resource configuration or the RRC configuration for SPS on the second BWP.

In one embodiment, the UE could start or restart the BWP timer and control period of the BWP timer based on the value when it is configured to release the Type 1 resource configuration or the RRC configuration for SPS on the second BWP (via e.g. RRC signalling, MAC control element or physical signalling). In this situation, the second BWP could be active.

In one embodiment, the UE may not start or restart the BWP timer for the second BWP on which the configured resources is (re-)initialised or (re-)activated. The UE may not start or restart the BWP timer when it switches to the second BWP (from a default BWP or the first BWP) or receives the dynamic scheduling for the second BWP on which the configured resources is (re-)initialised or (re-)activated (via e.g. RRC signalling, MAC control element or physical signalling). The UE may not start or restart the BWP timer when the configured resource is (re-)initialised or (re-)activated on the second BWP (via e.g. RRC signalling, MAC control element or physical signalling).

In one embodiment, the UE could stop the BWP timer when the configured resource is (re-)initialised or (re-)activated on the second BWP (via e.g. RRC signalling, MAC control element or physical signalling). The UE could start or restart the BWP timer and control period of the BWP timer based on the value if the configured resource is not (re-)initialised or (re-)activated on the second BWP. In this situation, the second BWP could be active. The UE could start or restart the BWP timer and control period of the BWP timer based on the value when it switches to the second BWP (from a default BWP or the first BWP) or receives the dynamic scheduling for the second BWP on which the configured resources is not (re-)initialised or (re-)activated (via e.g. RRC signalling, MAC control element or physical signalling). In this situation, the second BWP could be active. The UE could start or restart the BWP timer and control period of the BWP timer based on the value when it is configured to release or deactivate the configured resources on the second BWP (via e.g. RRC signalling, MAC control element or physical signalling). In this situation, the second BWP could be active.

In one embodiment, the UE could stop the BWP timer when it switches back to a default BWP (from the first BWP or the second BWP). The UE could switch back to a default BWP (from the first BWP or the second BWP) upon expiry of the BWP timer. The UE could switch back to a default BWP (from the first BWP or the second BWP) upon reception of indication indicating switching to the default BWP from the network (via e.g. RRC signalling, MAC control element or physical signalling).

Based on above solutions that the UE could stop a BWP timer for an active BWP on which Type 1 configuration or RRC configuration for SPS could be configured and/or configured resources could be (re-)initialised or (re-)activated. The active BWP could belong to a cell serving the UE. The UE could run a time alignment (TA) timer to maintain the uplink time alignment for the cell. When the TA timer expires and the BWP timer is not running, the UE could start the BWP timer. By this way, the UE could switch back to a default BWP from the active BWP upon expiry of the BWP timer. For example, the UE could start or restart the BWP timer upon expiry of the TA timer.

In one embodiment, the network could configure the UE with a first BWP. Besides, the network could configure the UE with a second BWP. The first BWP could belong to a serving cell. The second BWP could belong to the serving cell. Either the first BWP or the second BWP could be active (at a time) on the serving cell, or both the first BWP and the second BWP could be active (at a time) on the serving cell. The network could configure the UE to use a (common) BWP timer for the serving cell or separate BWP timers (e.g. a first BWP timer for the first BWP and a second BWP timer for the second BWP) for different BWPs (in the serving cell).

In the former case (i.e. using the BWP for the serving cell), the network could configure the UE to use a (common) value for the BWP timer for the serving cell or separate values of the BWP timer (e.g. a first value of the BWP timer and a second value of the BWP timer) for different BWPs (in the serving cell). In the latter case (i.e. using the first BWP timer and the second BWP timer), the network could configure the UE to use a (common) value for the first BWP timer and the second BWP timer (i.e. one value could be shared/used by the first BWP timer and the second BWP timer) for the serving cell or separate values (e.g. a first value for the first BWP timer and a second value for the second BWP timer) for different BWP timers (in the serving cell).

In one embodiment, the UE could be configured with Type 1 resource configuration and/or RRC configuration for SPS. Type 1 resource configuration could be configured on the first BWP and/or the second BWP. RRC configuration for SPS could be configured on the first BWP and/or the second BWP. The UE could be allocated with configured resources (e.g. Type 1 resources and/or SPS resources) after being configured with Type 1 resource configuration and/or RRC configuration for SPS.

In one embodiment, the UE could be served by a BWP on which no RRC configuration for SPS is configured. When the network determines to schedule the UE by SPS, the network could configure the UE with the RRC configuration for SPS on the BWP. In this situation, the length of a BWP timer associated with the BWP could be shorter than the length of SPS interval configured in the RRC configuration for SPS. Following are some alternatives for the network to handle the situation.

In one principle, the network could change the length of the BWP timer for scheduling the UE by SPS. The network could change the length of the BWP timer before, during, or after configuring RRC configuration for SPS or allocating SPS resources on the BWP. The length of the BWP timer could be changed to be larger than (or equal to) the length of the SPS interval. This principle could be illustrated in FIGS. 8 to 13.

For example, the network could configure the UE with the RRC configuration for SPS and the change of the length of the BWP timer via e.g. a control signalling which could be RRC signalling, MAC control element or physical signalling. As another example, the network could configure the UE with the RRC configuration for SPS via e.g. a first control signalling (which could be RRC signalling, MAC control element or physical signalling) and the change of the length of the BWP timer via e.g. a second control signalling (which could be RRC signalling, MAC control element or physical signalling). In this example, the first control signalling could be sent to the UE before sending the second control signalling, or the first control signalling could be sent to the UE after sending the second control signalling.

After the UE is configured with the RRC configuration for SPS, the network could further allocate the UE with SPS resources on the BWP (via e.g. physical signalling). When the BWP is active, the UE could start or restart the BWP timer with the new length of the BWP timer after being configured with the RRC configuration for SPS. Alternatively, the UE could start or restart the BWP timer with the new length of the BWP timer when the BWP is active after being allocated with the SPS resources. Furthermore, the UE could restart the BWP timer at the timing where is the opportunity for transmission or reception using the SPS resources.

In another principle, the network could determine to configure the UE not to use the BWP timer on the BWP if the network could schedule the UE by SPS on the BWP. The network could configure the UE not to use the BWP timer before, during, or after configuring RRC configuration for SPS or allocating SPS resources on the BWP. The network could de-configure the UE with the BWP timer before, during, or after configuring RRC configuration for SPS or allocating SPS resources on the BWP. The network could configure the UE to release the BWP timer before, during, or after configuring RRC configuration for SPS or allocating SPS resources on the BWP. The network could configure the UE to disable the BWP timer before, during, or after configuring RRC configuration for SPS or allocating SPS resources on the BWP. The method of disabling the BWP timer could be to set a very large value or infinite to the length of the BWP timer. This principle could be illustrated in FIGS. 14 to 17.

For example, the network could configure the UE with the RRC configuration for SPS on the BWP and configure the UE not to use the BWP timer associated with the BWP via e.g. a control signalling which could be RRC signalling, MAC control element or physical signalling. In the control signalling, de-configuration of the BWP timer could be included. After being configured not to use the BWP timer, the UE does not start or restart the BWP timer when the BWP is active. If the BWP timer is running, the UE could stop the BWP timer. After being configured with the RRC configuration for SPS, the network could further allocate the UE with SPS resources on the BWP (via e.g. physical signalling).

As another example, the network could configure the UE not to use the BWP timer associated with the BWP via e.g. a first control signalling (which could be RRC signalling, MAC control element or physical signalling) and configure the UE with the RRC configuration for SPS on the BWP via e.g. a second control signalling (which could be RRC signalling, MAC control element or physical signalling). In the first control signalling, de-configuration of the BWP timer could be included. In this example, the first control signalling could be sent to the UE before sending the second control signalling. After being configured not to use the BWP timer, the UE does not start or restart the BWP timer when the BWP is active. If the BWP timer is running, the UE could stop the BWP timer. After being configured with the RRC configuration for SPS, the network could further allocate the UE with SPS resources on the BWP (via e.g. physical signalling).

As another example, the network could configure the UE not to use the BWP timer associated with the BWP via e.g. a first control signalling (which could be RRC signalling, MAC control element or physical signalling) and configure the UE with the RRC configuration for SPS on the BWP via e.g. a second control signalling (which could be RRC signalling, MAC control element or physical signalling). In the first control signalling, de-configuration of the BWP timer could be included. In this example, the first control signalling could be sent to the UE after sending the second control signalling. After being configured not to use the BWP timer, the UE does not start or restart the BWP timer when the BWP is active. If the BWP timer is running, the UE could stop the BWP timer. After being configured with the RRC configuration for SPS or being configured not to use the BWP timer, the network could further allocate the UE with SPS resources on the BWP (via e.g. physical signalling).

As another example, the network configure the UE with the RRC configuration for SPS via e.g. a first control signalling (which could be RRC signalling, MAC control element or physical signalling) and could configure the UE not to use the BWP timer via e.g. a second control signalling (which could be RRC signalling, MAC control element or physical signalling). In the second control signalling, de-configuration of the BWP timer could be included. After being configured with the RRC configuration for SPS, the network could further allocate the UE with SPS resources on the BWP (via e.g. physical signalling). In this example, the second control signalling could be sent to the UE after being allocated with the SPS resources. After being configured not to use the BWP timer, the UE does not start or restart the BWP timer when the BWP is active. If the BWP timer is running, the UE could stop the BWP timer.

In one embodiment, the BWP timer could be the first BWP timer used for the first BWP or the second BWP timer used for the second BWP, or could be the common BWP timer used for the first BWP and the second BWP. The BWP associated with the BWP timer could be the first BWP or the second BWP.

In another principle, the network could schedule the UE by SPS (only) on a default BWP. The network could configure the UE with Type 1 resource configuration and/or RRC configuration for SPS (only) on the default BWP. The network could reconfigure the UE to change a BWP from non-default BWP to default BWP for configuring Type 1 resource configuration and/or RRC configuration for SPS on the BWP. The network could (re-)configure the UE with a BWP as default BWP for configuring Type 1 resource configuration and/or RRC configuration for SPS on the BWP. The network could configure the UE with a non-default BWP on which no Type 1 resource configuration and/or RRC configuration for SPS could be configured.

Another alternative to solve the issue mentioned above could be that a UE determines whether to switch an active BWP to a default BWP when a BWP timer expires based on whether there is any configured downlink assignment or configured grant (Type 1 or Type 2) on the active BWP for the UE. The UE could not switch an active BWP to a default BWP if there is any configured downlink assignment or configured grant (Type 1 or Type 2) on the active BWP for the UE. The UE may not deactivate the active BWP when the BWP timer expires if there is any configured downlink assignment or configured grant (Type 1 or Type 2) on the active BWP for the UE. The UE may not active the default BWP when the BWP timer expires if there is any configured downlink assignment or configured grant (Type 1 or Type 2) on the active BWP for the UE. The active BWP may be a non-default BWP. The SPS may be configured grant type 1. The SPS may be configured grant type 2.

For example, the UE could not switch the active BWP to the default BWP if it is configured with Type 1 configuration or RRC configuration for SPS on the active BWP. As another example, the UE could not switch the active BWP to the default BWP if configured resources (e.g. Type 1 resources or SPS resources) is not (re-)initialised or (re-)activated (via e.g. RRC signalling, MAC control element or physical signalling) on the active BWP. In addition, the UE could start or restart a BWP timer for the active BWP. When the BWP timer expires, the UE could not switch from the active BWP to the default BWP if the Type 1 configuration or RRC configuration for SPS on the active BWP and/or the configured resources are (re-) initialised or (re-)activated on the active BWP. More specifically, the UE could start or restart the BWP timer upon expiry of the BWP timer if the Type 1 configuration or RRC configuration for SPS on the active BWP and/or the configured resources are (re-)initialised or (re-)activated on the active BWP.

In one embodiment, the UE may switch an active BWP to a default BWP when a BWP timer expires if there is no configured downlink assignment or configured grant (Type 1 or Type 2) on the active BWP for the UE. The UE may deactivate the active BWP when the BWP timer expires if there is no configured downlink assignment or configured grant (Type 1 or Type 2) on the active BWP for the UE. The UE may active the default BWP when the BWP timer expires if there is no configured downlink assignment or configured grant (Type 1 or Type 2) on the active BWP for the UE. The active BWP may be a non-default BWP. The SPS may be configured grant type 1. The SPS may be configured grant type 2.

Examples of standard text proposal of the invention are described below:

If BWP-InactivityTimer is configured, the MAC entity shall for each active DL BWP:
> 1> if the Default-DL-BWP is configured, and the active DL BWP is not the BWP indicated by the Default-DL-BWP; or
> 1> if the Default-DL-BWP is not configured, and the active DL BWP is not the initial BWP:
> > 2> if a PDCCH indicating downlink assignment is received on the active BWP; or
> > 2> if a PDCCH for BWP switching is received on the active DL BWP, and the MAC entity switches the active BWP:
> > > 3> start or restart the BWP-InactivityTimer associated with the active DL BWP;
> > 2> if Random Access procedure is initiated:
> > > 3> stop the BWP-InactivityTimer;
> > 2> if BWP-InactivityTimer associated with the active DL BWP expires:
> > > 3> if the Default-DL-BWP is configured:
> > > > 4> perform BWP switching to a BWP indicated by the Default-DL-BWP;
> > > 3> else:
> > > > 4> perform BWP switching to the initial DL BWP.

[ . . . ]

If BWP-InactivityTimer is configured, the MAC entity shall for each activated Serving Cell:
> 1> if the Default-DL-BWP is configured, and the active DL BWP is not the BWP indicated by the Default-DL-BWP and is not configured with SPS; or
> 1> if the Default-DL-BWP is not configured, and the active DL BWP is not the initial BWP and is not configured with SPS:
> > 2> if a PDCCH indicating downlink assignment is received on the active BWP; or
> > 2> if a PDCCH for BWP switching is received on the active DL BWP, and the MAC entity switches the active BWP:
> > > 3> start or restart the BWP-InactivityTimer associated with the active DL BWP;
> > 2> if Random Access procedure is initiated:
> > > 3> stop the BWP-InactivityTimer;
> > 2> if BWP-InactivityTimer associated with the active DL BWP expires:
> > > 3> if the Default-DL-BWP is configured:
> > > > 4> perform BWP switching to a BWP indicated by the Default-DL-BWP;
> > > 3> else:
> > > > 4> perform BWP switching to the initial DL BWP.

[ . . . ]

If BWP-InactivityTimer is configured, the MAC entity shall for each activated Serving Cell:
> 1> if the Default-DL-BWP is configured, and the active DL BWP is not the BWP indicated by the Default-DL-BWP and no SPS is activated on the active DL BWP; or
> 1> if the Default-DL-BWP is not configured, and the active DL BWP is not the initial BWP and no SPS is activated on the active DL BWP:
> > 2> if a PDCCH indicating downlink assignment is received on the active BWP; or
> > 2> if a PDCCH for BWP switching is received on the active DL BWP, and the MAC entity switches the active BWP:
> > > 3> start or restart the BWP-InactivityTimer associated with the active DL BWP;
> > 2> if Random Access procedure is initiated:
> > > 3> stop the BWP-InactivityTimer;
> > 2> if BWP-InactivityTimer associated with the active DL BWP expires:
> > > 3> if the Default-DL-BWP is configured:
> > > > 4> perform BWP switching to a BWP indicated by the Default-DL-BWP;
> > > 3> else:
> > > > 4> perform BWP switching to the initial DL BWP.

Figure 18:
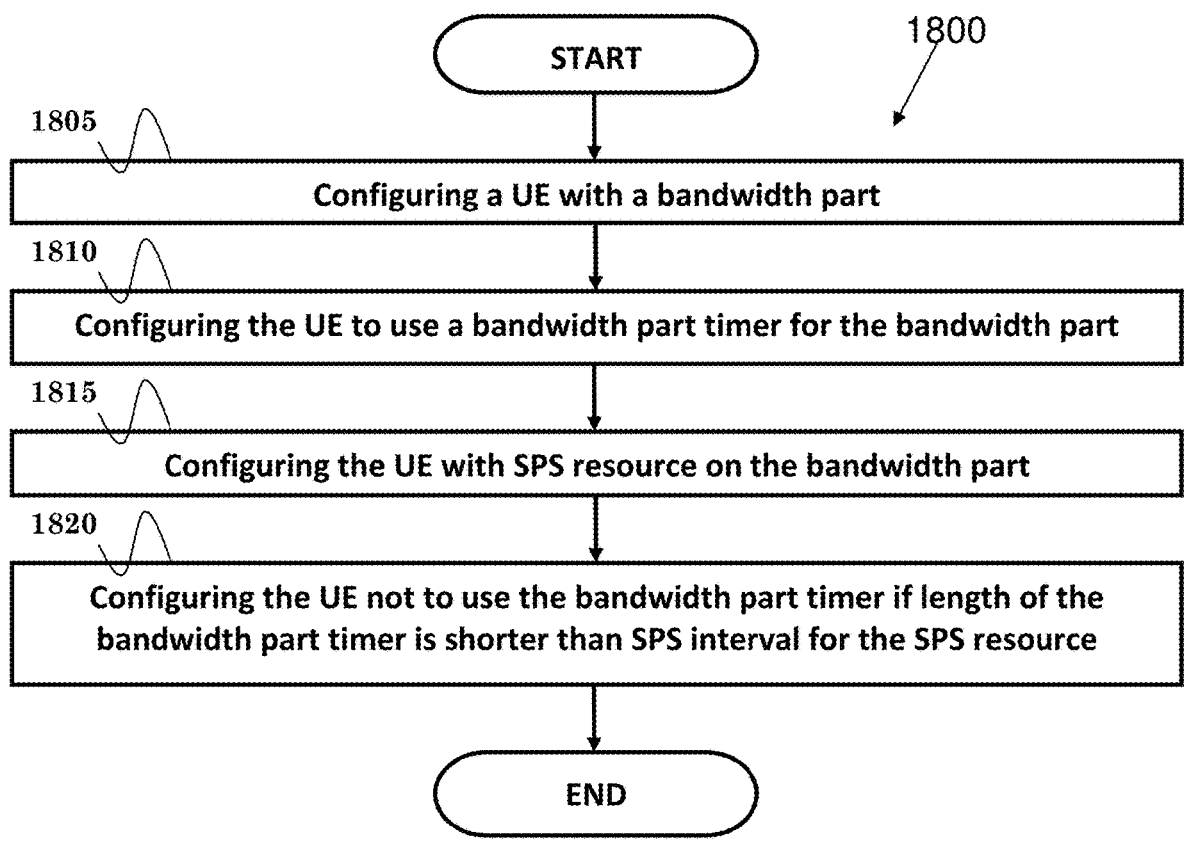
FIG. 18 is a flow chart according to one exemplary embodiment.

FIG. 18 is a flow chart 1800 according to one exemplary embodiment from the perspective of a network node. In step 1805, the network node configures a UE with a bandwidth part. In step 1810, the network node configures the UE to use a bandwidth part timer for the bandwidth part. In step 1815, the network node configures the UE with SPS resource on the bandwidth part. In step 1820, the network node configures the UE not to use the bandwidth part timer if length of the bandwidth part timer is shorter than SPS interval for the SPS resource.

In one embodiment, the network node may not configuring the UE not to use the bandwidth part timer if the length of the bandwidth part timer is longer than or equal to the SPS interval for the SPS resource. The network node may configure the SPS interval and configures the UE not to use the bandwidth part timer via different dedicated signalling or the same dedicated signalling.

In one embodiment, the dedicated signalling could be RRC signalling. The bandwidth part timer could be started or restarted if a downlink control information is transmitted to the UE on the bandwidth part or a packet is transmitted to the UE or is received from the UE on the bandwidth part.

In one embodiment, the UE could switch from the bandwidth part to a default bandwidth part or an initial bandwidth part when the bandwidth part timer expires. The SPS resource could be configured on the UE when the UE uses the bandwidth part timer. The SPS resource could be a resource on which the UE periodically performs UL transmission or DL reception. The SPS interval could be an interval between two UL transmissions or DL receptions performed by the UE based on the SPS resource.

Referring back to FIGS. 3 and 4, in one exemplary embodiment of a network node, the device 300 includes a program code 312 stored in the memory 310. The CPU 308 could execute program code 312 to enable the network node (i) to configure a UE with a bandwidth part, (ii) to configure the UE to use a bandwidth part timer for the bandwidth part, (iii) to configure the UE with SPS resource on the bandwidth part, and (iv) to configure the UE not to use the bandwidth part timer if length of the bandwidth part timer is shorter than SPS interval for the SPS resource. Furthermore, the CPU 308 can execute the program code 312 to perform all of the above-described actions and steps or others described herein.

Figure 19:
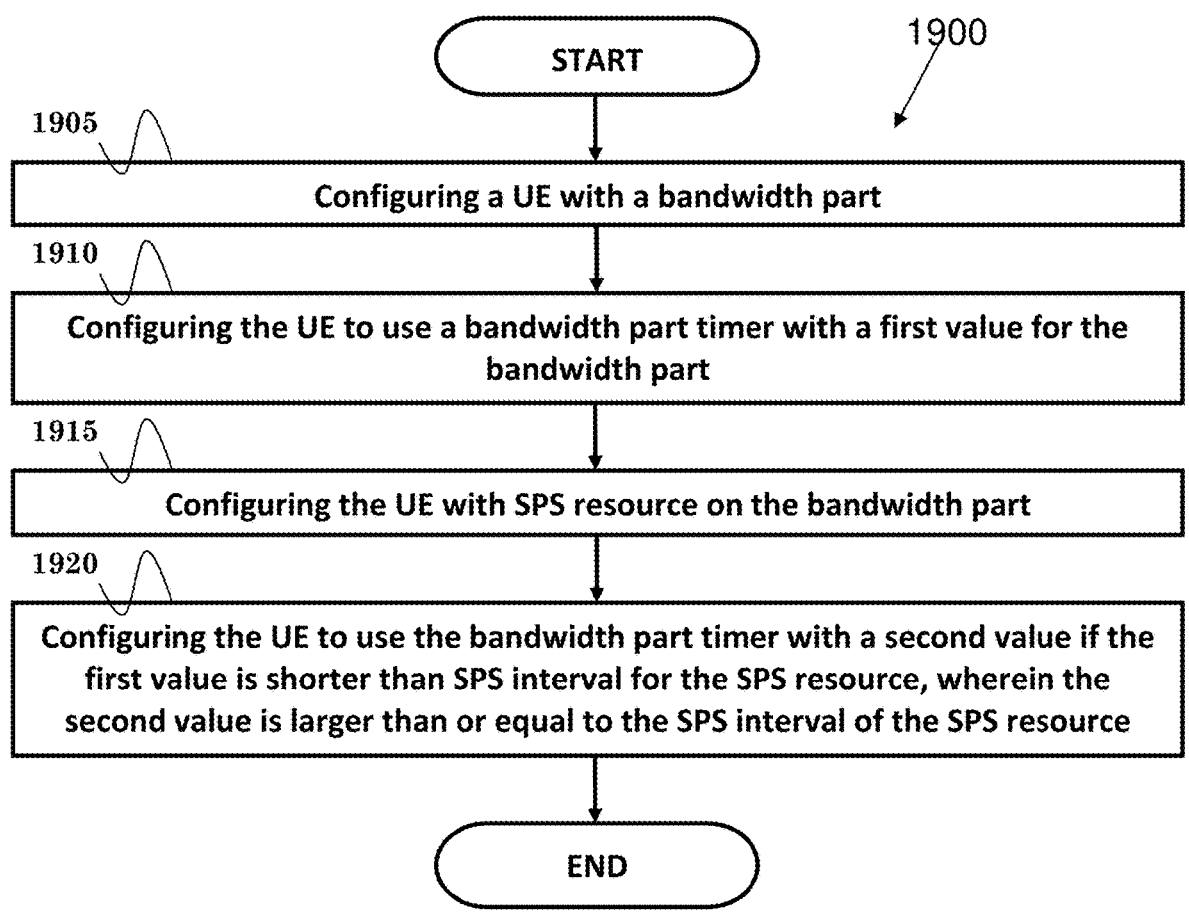
FIG. 19 is a flow chart according to one exemplary embodiment.

FIG. 19 is a flow chart 1900 according to one exemplary embodiment from the perspective of a network node. In step 1905, the network node configures a UE with a bandwidth part. In step 1910, the network node configures the UE to use a bandwidth part timer with a first value for the bandwidth part. In step 1915, the network node configures the UE with SPS resource on the bandwidth part. In step 1920, the network node configures the UE to use the bandwidth part timer with a second value if the first value is shorter than SPS (Semi-Persistent Scheduling) interval for the SPS resource, wherein the second value is larger than or equal to the SPS interval of the SPS resource.

In one embodiment, the network node may not configuring the UE to use the bandwidth part timer with the second value if the first value is longer than or equal to the SPS interval for the SPS resource. The network node may configure the SPS interval and may configure the UE to use the bandwidth part timer with the second value via different dedicated signalling or the same dedicated signalling.

In one embodiment, the dedicated signalling could be RRC signalling. The bandwidth part timer could be started or restarted if a downlink control information is transmitted to the UE on the bandwidth part or a packet is transmitted to the UE or is received from the UE on the bandwidth part.

In one embodiment, the UE could switch from the bandwidth part to a default bandwidth part or an initial bandwidth part when the bandwidth part timer expires. The SPS resource could be configured on the UE when the UE uses the bandwidth part timer. The SPS resource could be a resource on which the UE periodically performs UL transmission or DL reception. The SPS interval could be an interval between two UL transmissions or DL receptions performed by the UE based on the SPS resource.

Referring back to FIGS. 3 and 4, in one exemplary embodiment of a network node, the device 300 includes a program code 312 stored in the memory 310. The CPU 308 could execute program code 312 to enable the network node (i) to configure a UE with a bandwidth part, (ii) to configure the UE to use a bandwidth part timer with a first value for the bandwidth part, (iii) to configure the UE with SPS resource on the bandwidth part, and (iv) to configure the UE to use the bandwidth part timer with a second value if the first value is shorter than SPS (Semi-Persistent Scheduling) interval for the SPS resource, wherein the second value is larger than or equal to the SPS interval of the SPS resource. Furthermore, the CPU 308 can execute the program code 312 to perform all of the above-described actions and steps or others described herein.

Figure 20:
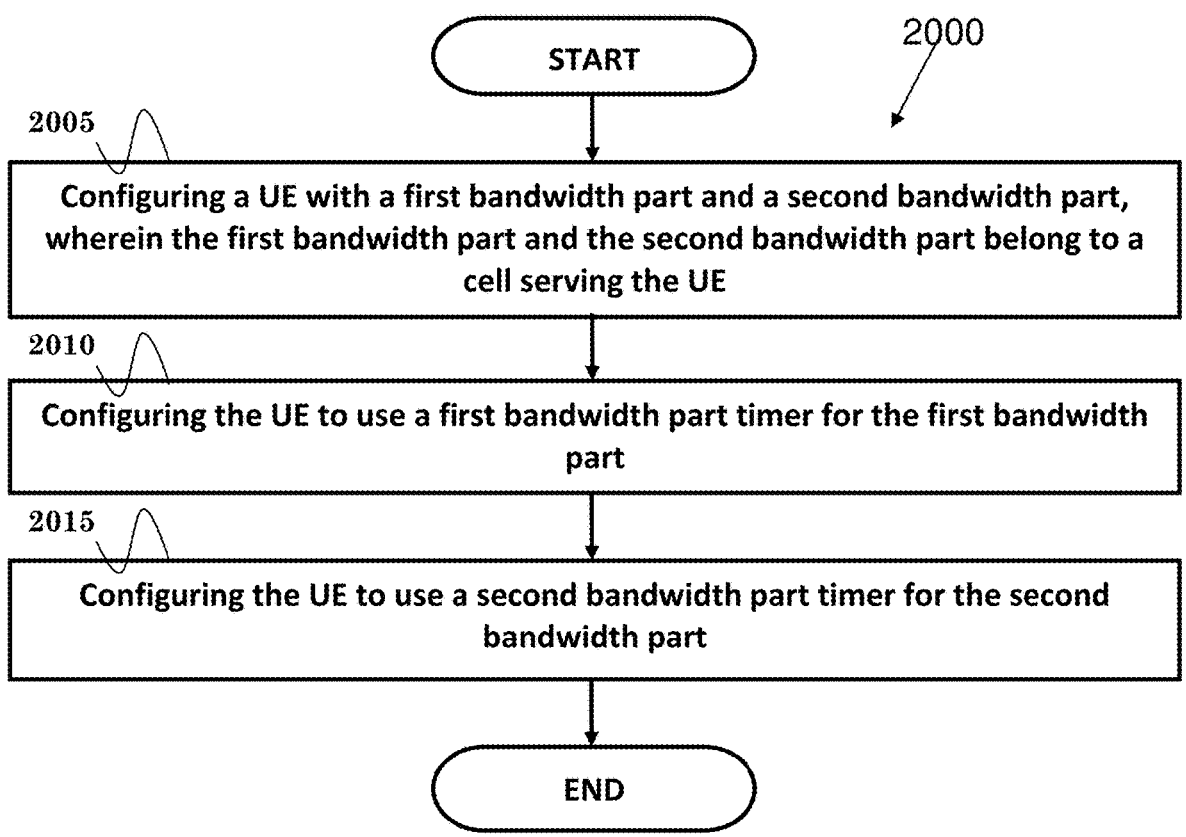
FIG. 20 is a flow chart according to one exemplary embodiment.

FIG. 20 is a flow chart 2000 according to one exemplary embodiment from the perspective of a network node. In step 2005, the network node configures a UE with a first bandwidth part and a second bandwidth part, wherein the first bandwidth part and the second bandwidth part belong to a cell serving the UE. In step 2010, the network node configures the UE to use a first bandwidth part timer for the first bandwidth part. In step 2015, the network node configures the UE to use a second bandwidth part timer for the second bandwidth part.

In one embodiment, the network node could configure the UE with configuration for configured scheduling on the second bandwidth part. Furthermore, the network node could allocate the UE with configured resources on the second bandwidth part.

Referring back to FIGS. 3 and 4, in one exemplary embodiment of a network node, the device 300 includes a program code 312 stored in the memory 310. The CPU 308 could execute program code 312 to enable the network node (i) to configure a UE with a first bandwidth part and a second bandwidth part, wherein the first bandwidth part and the second bandwidth part belong to a cell serving the UE, (ii) to configure the UE to use a first bandwidth part timer for the first bandwidth part, and (iii) to the UE to use a second bandwidth part timer for the second bandwidth part. Furthermore, the CPU 308 can execute the program code 312 to perform all of the above-described actions and steps or others described herein.

Figure 21:
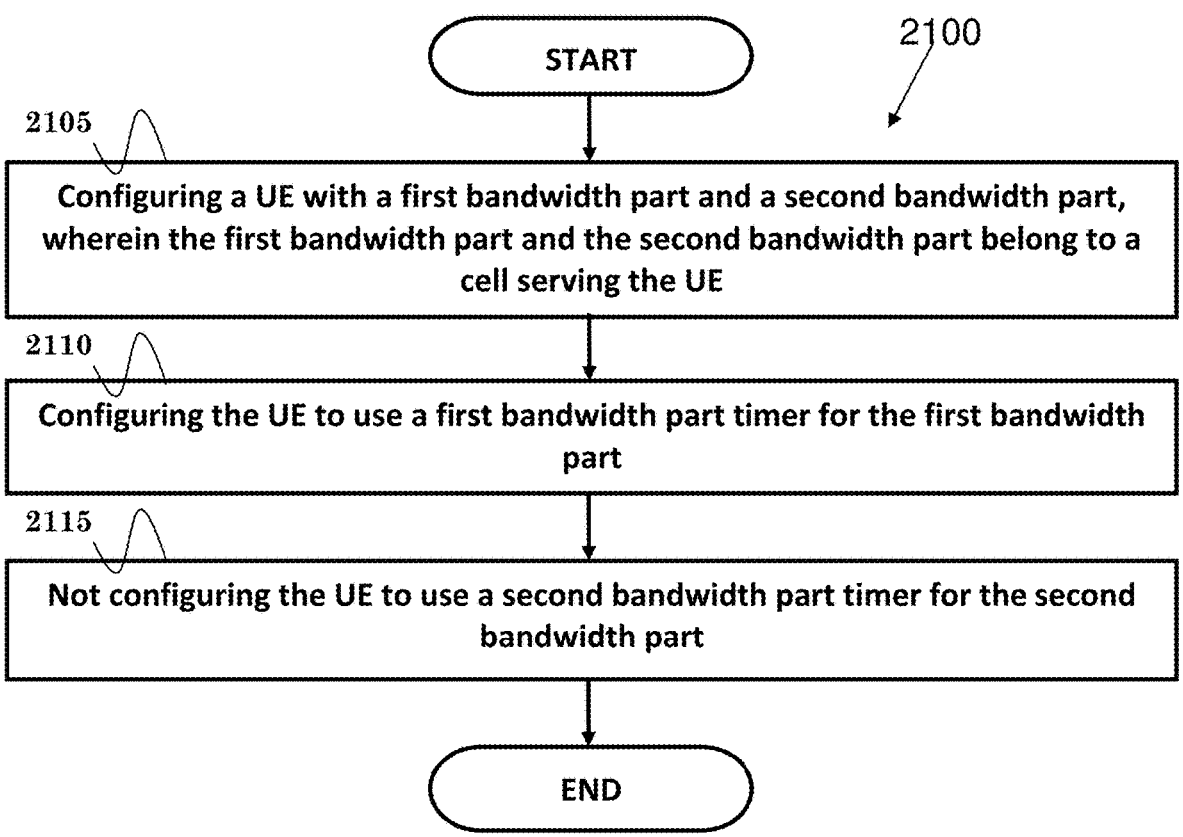
FIG. 21 is a flow chart according to one exemplary embodiment.

FIG. 21 is a flow chart 2100 according to one exemplary embodiment from the perspective of a network node. In step 2105, the network node configures a UE with a first bandwidth part and a second bandwidth part, wherein the first bandwidth part and the second bandwidth part belong to a cell serving the UE. In step 2110, the network node configures the UE to use a first bandwidth part timer for the first bandwidth part. In step 2115, the network node does not configure the UE to use a second bandwidth part timer for the second bandwidth part.

In one embodiment, the signalling used to configure the UE with the first bandwidth part and the second bandwidth part could indicate that the bandwidth part timer is not used for the second bandwidth part. Alternatively, the signalling used to configure the UE to use the bandwidth part timer could indicate that the bandwidth part timer is not used for the second bandwidth part. Alternatively, the signalling used to configure the UE not to use any bandwidth part timer for the second bandwidth part could indicate that no bandwidth part timer is used for the second bandwidth part.

In one embodiment, the network node could configure the UE with configuration for configured scheduling on the second bandwidth part. Furthermore, the network node could allocate the UE with configured resources on the second bandwidth part.

Referring back to FIGS. 3 and 4, in one exemplary embodiment of a network node, the device 300 includes a program code 312 stored in the memory 310. The CPU 308 could execute program code 312 to enable the network node (i) to configure a UE with a first bandwidth part and a second bandwidth part, wherein the first bandwidth part and the second bandwidth part belong to a cell serving the UE, (ii) to configure the UE to use a first bandwidth part timer for the first bandwidth part, and (iii) to not configure the UE to use a second bandwidth part timer for the second bandwidth part. Furthermore, the CPU 308 can execute the program code 312 to perform all of the above-described actions and steps or others described herein.

Figure 22:
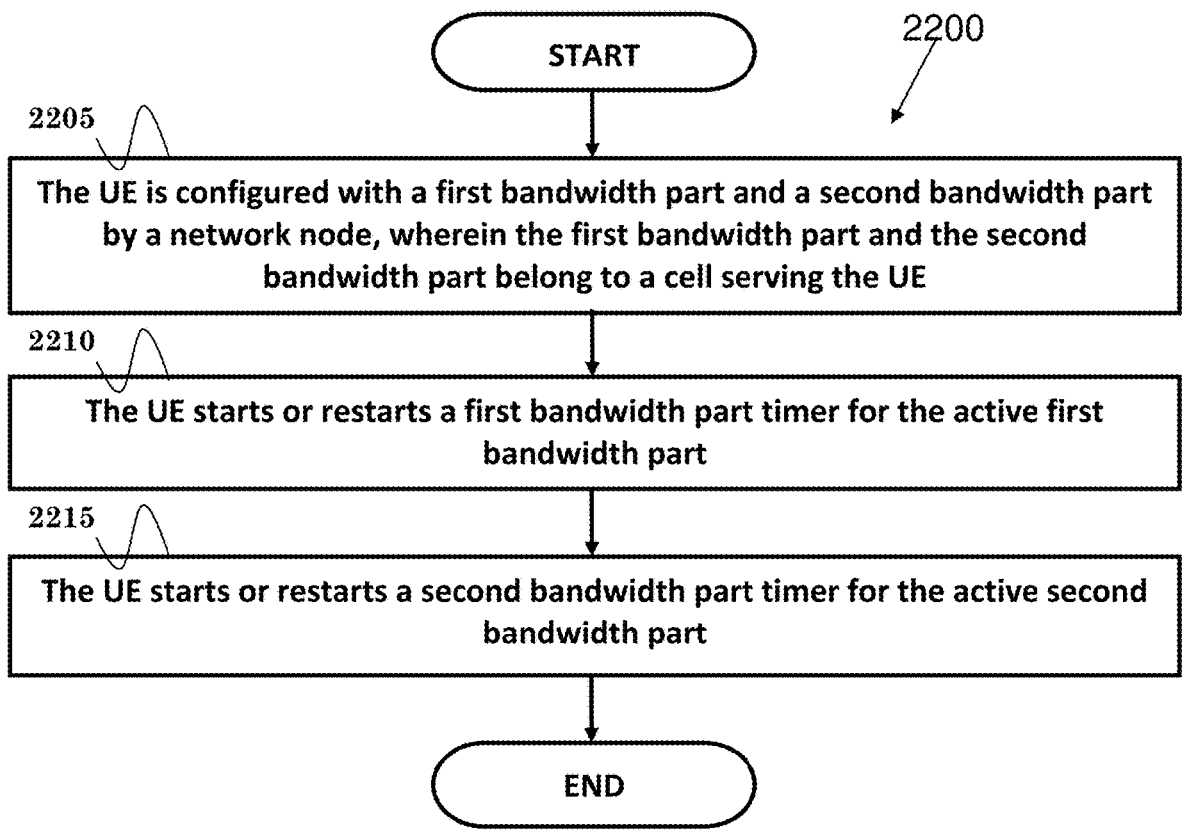
FIG. 22 is a flow chart according to one exemplary embodiment.

FIG. 22 is a flow chart 2200 according to one exemplary embodiment from the perspective of a UE. In step 2205, the UE is configured with a first bandwidth part and a second bandwidth part by a network node, wherein the first bandwidth part and the second bandwidth part belong to a cell serving the UE. In step 2210, the UE starts or restarts a first bandwidth part timer for the active first bandwidth part. In step 2215, the UE starts or restarts a second bandwidth part timer for the active second bandwidth part.

In one embodiment, the UE could be configured to use the first bandwidth part timer for the first bandwidth part and to use the second bandwidth part timer for the second bandwidth part. The UE could switch to a default bandwidth part upon expiry of the first bandwidth part timer.

In one embodiment, the UE could be configured with configuration for configured scheduling on the second bandwidth part. The UE could be allocated with configured resources on the second bandwidth part.

Referring back to FIGS. 3 and 4, in one exemplary embodiment of a UE, the device 300 includes a program code 312 stored in the memory 310. The CPU 308 could execute program code 312 to enable the UE (i) to be configured with a first bandwidth part and a second bandwidth part by a network node, wherein the first bandwidth part and the second bandwidth part belong to a cell serving the UE, (ii) to start or restart a first bandwidth part timer for the active first bandwidth part, and (iii) to start or restart a second bandwidth part timer for the active second bandwidth part. Furthermore, the CPU 308 can execute the program code 312 to perform all of the above-described actions and steps or others described herein.

Figure 23:
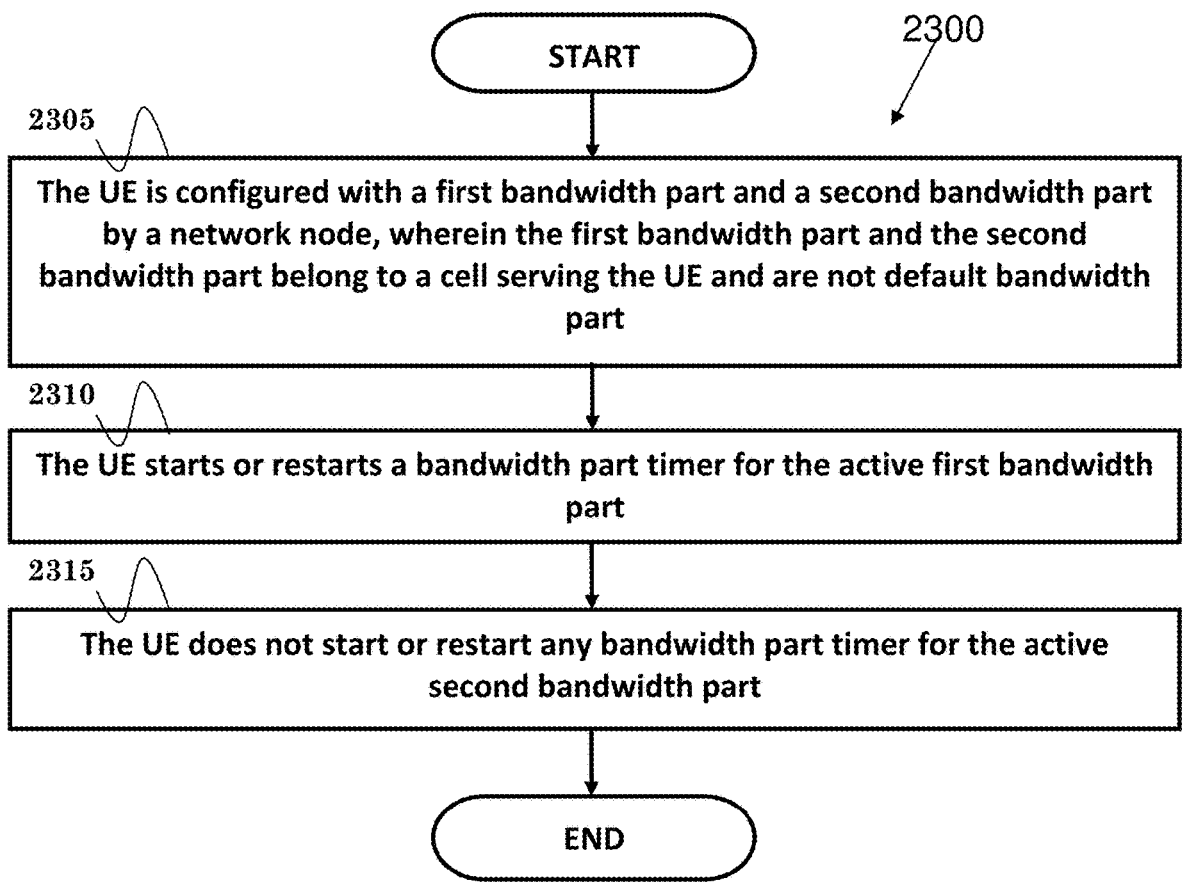
FIG. 23 is a flow chart according to one exemplary embodiment.

FIG. 23 is a flow chart 2300 according to one exemplary embodiment from the perspective of a UE. In step 2305, the UE is configured with a first bandwidth part and a second bandwidth part by a network node, wherein the first bandwidth part and the second bandwidth part belong to a cell serving the UE and are not default bandwidth part. In step 2310, the UE starts or restarts a bandwidth part timer for the active first bandwidth part. In step 2315, the UE does not start or restart any bandwidth part timer for the active second bandwidth part.

In one embodiment, the UE could be configured to use the bandwidth part timer for the first bandwidth part and not to use any bandwidth part timer for the second bandwidth part.

In one embodiment, the UE could be to use the bandwidth part timer for the first bandwidth part, and not to use any bandwidth part timer for the second bandwidth part. The UE could receive a signalling from the network node, wherein the signalling used to configure the UE with the first bandwidth part and the second bandwidth part could indicate that the bandwidth part timer is not used for the second bandwidth part. Alternatively, the UE could receive a signalling from the network node, wherein the signalling used to configure the UE to use the bandwidth part timer could indicate that the bandwidth part timer is not used for the second bandwidth part. Alternatively, the UE could receive a signalling from the network node, wherein the signalling used to configure the UE not to use any bandwidth part timer for the second bandwidth part could indicate that no bandwidth part timer is used for the second bandwidth part.

In one embodiment, the UE could be configured with configuration for configured scheduling on the second bandwidth part. The UE could be allocated with configured resources on the second bandwidth part.

In one embodiment, the UE could switch to a default bandwidth part upon expiry of the bandwidth part timer. The UE could stop the bandwidth part timer when the UE switches from the first bandwidth part to the second bandwidth part or the default bandwidth part. The UE could start or restart the bandwidth part timer for the first bandwidth part when the UE switches from the default bandwidth part or the second bandwidth part to the first bandwidth part.

Referring back to FIGS. 3 and 4, in one exemplary embodiment of a UE, the device 300 includes a program code 312 stored in the memory 310. The CPU 308 could execute program code 312 to enable the UE (i) to be configured with a first bandwidth part and a second bandwidth part by a network node, wherein the first bandwidth part and the second bandwidth part belong to a cell serving the UE and are not default bandwidth part, (ii) to start or restart a bandwidth part timer for the active first bandwidth part, and (iii) to not start or restart any bandwidth part timer for the active second bandwidth part. Furthermore, the CPU 308 can execute the program code 312 to perform all of the above-described actions and steps or others described herein.

In the context of the embodiments illustrated in FIGS. 21-23 and discussed above, in one embodiment, the length of the first bandwidth part timer may not be infinite or zero. The length of the second bandwidth part timer could be infinite.

In one embodiment, the active first bandwidth part could mean that the first bandwidth part is an active bandwidth part. The active second bandwidth part could mean that the second bandwidth part is an active bandwidth part.

In one embodiment, the configuration for configured scheduling could be SPS configuration (e.g. configuration of DL SPS or configured grant Type 1 or configured grant Type 2). The configured resources could be SPS resources (e.g. configured downlink assignment or configured grant Type 1 or configured grant Type 2 resources). The network node could be a base station (e.g. gNB).

Figure 24:
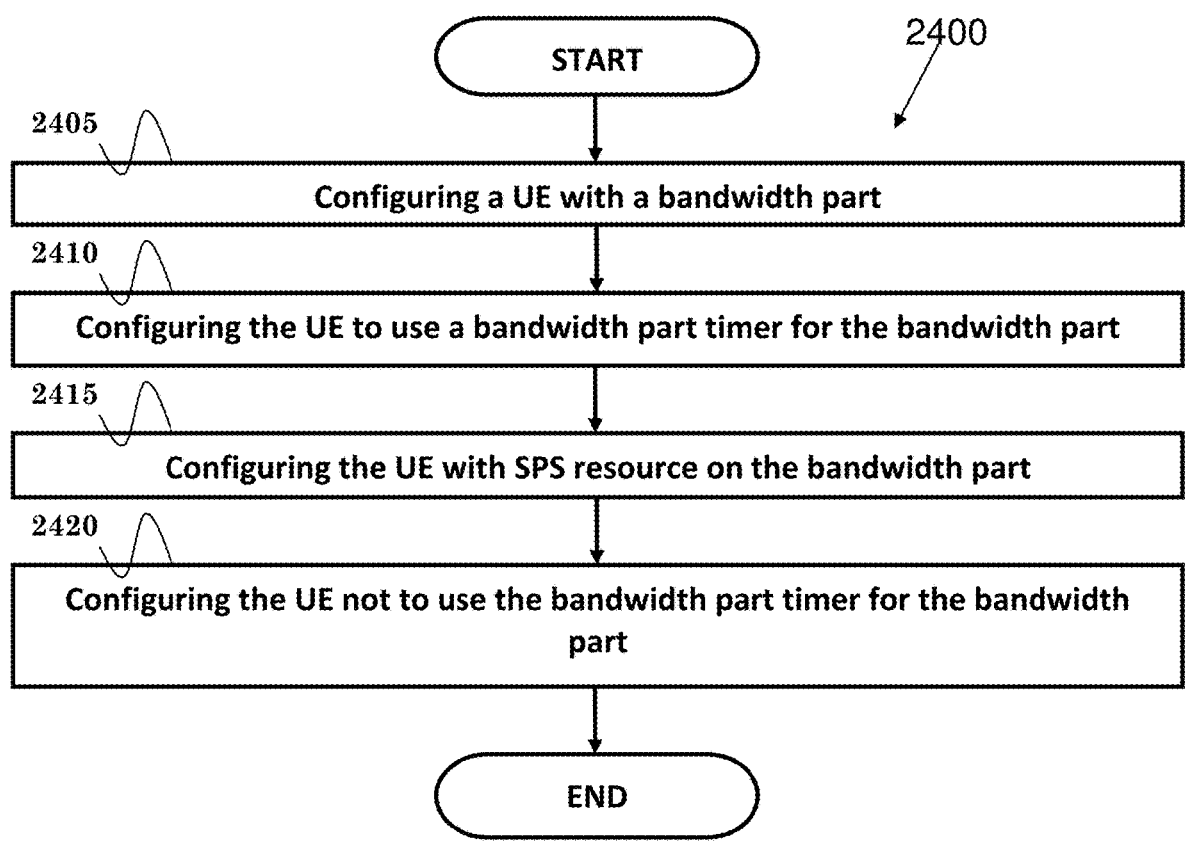
FIG. 24 is a flow chart according to one exemplary embodiment.

FIG. 24 is a flow chart 2400 according to one exemplary embodiment from the perspective of a network node. In step 2405, the network node configures a UE with a bandwidth part. In step 2410, the network node configures the UE to use a bandwidth part timer for the bandwidth part. In step 2415, the network node configures the UE with SPS resource on the bandwidth part. In step 2420, the network node configures the UE not to use the bandwidth part timer for the bandwidth part.

In one embodiment, a first dedicated signalling used to configure the UE to use the bandwidth part timer for the bandwidth part could be sent to the UE. A second dedicated signalling used to configure the SPS configuration could be sent to the UE. A third dedicated signalling used to configure the UE not to use the bandwidth part timer for the bandwidth part could be sent to the UE.

In one embodiment, the second dedicated signalling could be the same as the third dedicated signalling. The de-configuration of the bandwidth part timer could be included in the third dedicated signalling. The first, second, or third dedicated signalling could be RRC signalling, MAC control element, or physical signalling.

In one embodiment, the network node could configure the UE not to use the bandwidth part timer for the bandwidth part before releasing the SPS resource.

Referring back to FIGS. 3 and 4, in one exemplary embodiment of a network node, the device 300 includes a program code 312 stored in the memory 310. The CPU 308 could execute program code 312 to enable the network node (i) to configure a UE with a bandwidth part, (ii) to configure the UE to use a bandwidth part timer for the bandwidth part, (iii) to configure the UE with SPS resource on the bandwidth part, and (iv) to configure the UE not to use the bandwidth part timer for the bandwidth part. Furthermore, the CPU 308 can execute the program code 312 to perform all of the above-described actions and steps or others described herein.

Figure 25:
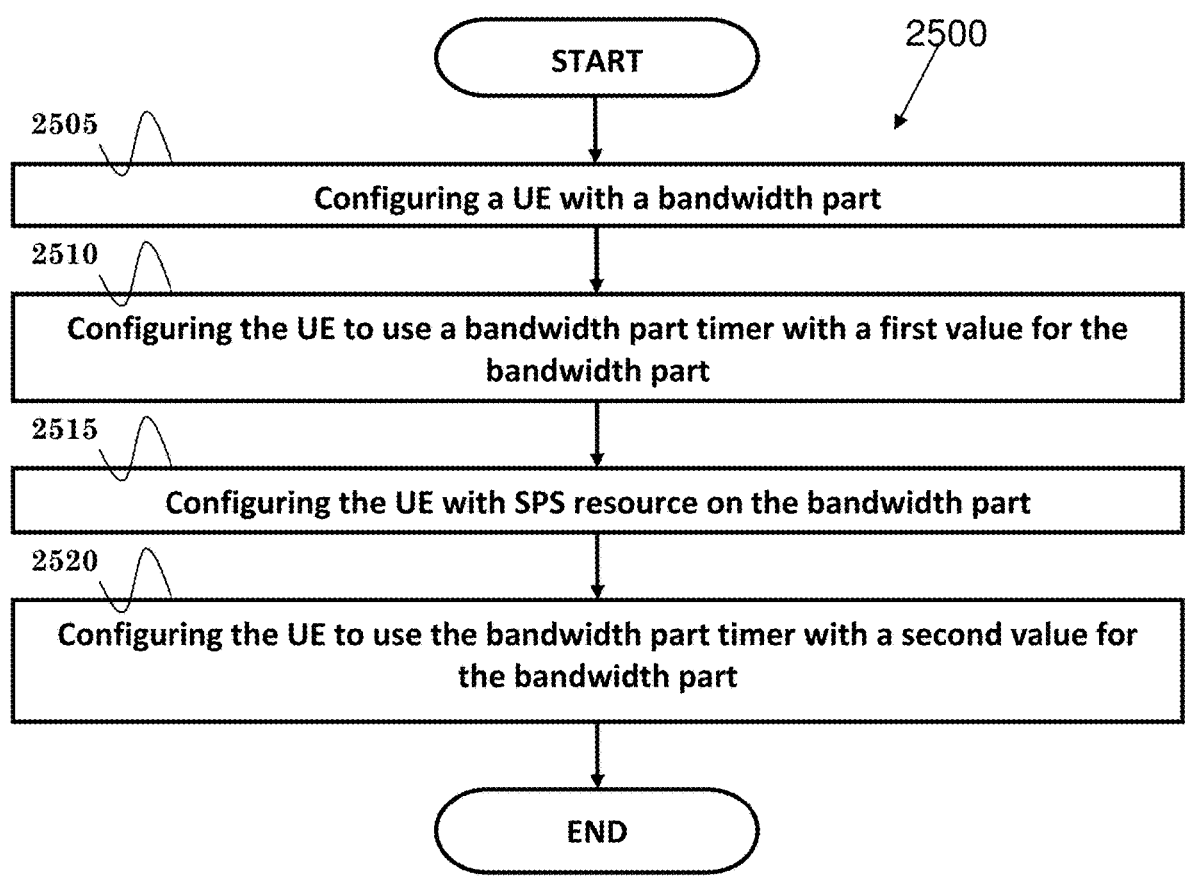
FIG. 25 is a flow chart according to one exemplary embodiment.

FIG. 25 is a flow chart 2500 according to one exemplary embodiment from the perspective of a network node. In step 2505, the network node configures a UE with a bandwidth part. In step 2510, the network node configures the UE to use a bandwidth part timer with a first value for the bandwidth part. In step 2515, the network node configures the UE with SPS resource on the bandwidth part. In step 2520, the network node configures the UE to use the bandwidth part timer with a second value for the bandwidth part.

In one embodiment, wherein a first dedicated signalling used to configure the UE with the bandwidth part and the first value for the bandwidth part timer could be sent to the UE. A second dedicated signalling used to configure the SPS configuration could be sent to the UE. A third dedicated signalling used to configure the UE with the second value for the bandwidth part timer could be sent to the UE. The second dedicated signalling could be the same as the third dedicated signalling.

In one embodiment, the length of the bandwidth part timer could be set based on the first value or the second value. The second value could be larger than or equal to the first value.

In one embodiment, the network node could configure the UE to use the bandwidth part timer with the second value for the bandwidth part before releasing the SPS resource.

Referring back to FIGS. 3 and 4, in one exemplary embodiment of a network node, the device 300 includes a program code 312 stored in the memory 310. The CPU 308 could execute program code 312 to enable the network node (i) to configure a UE with a bandwidth part, (ii) to configure the UE to use a bandwidth part timer with a first value for the bandwidth part, (iii) to configure the UE with SPS resource on the bandwidth part, and (iv) to configure the UE to use the bandwidth part timer with a second value for the bandwidth part. Furthermore, the CPU 308 can execute the program code 312 to perform all of the above-described actions and steps or others described herein.

Figure 26:
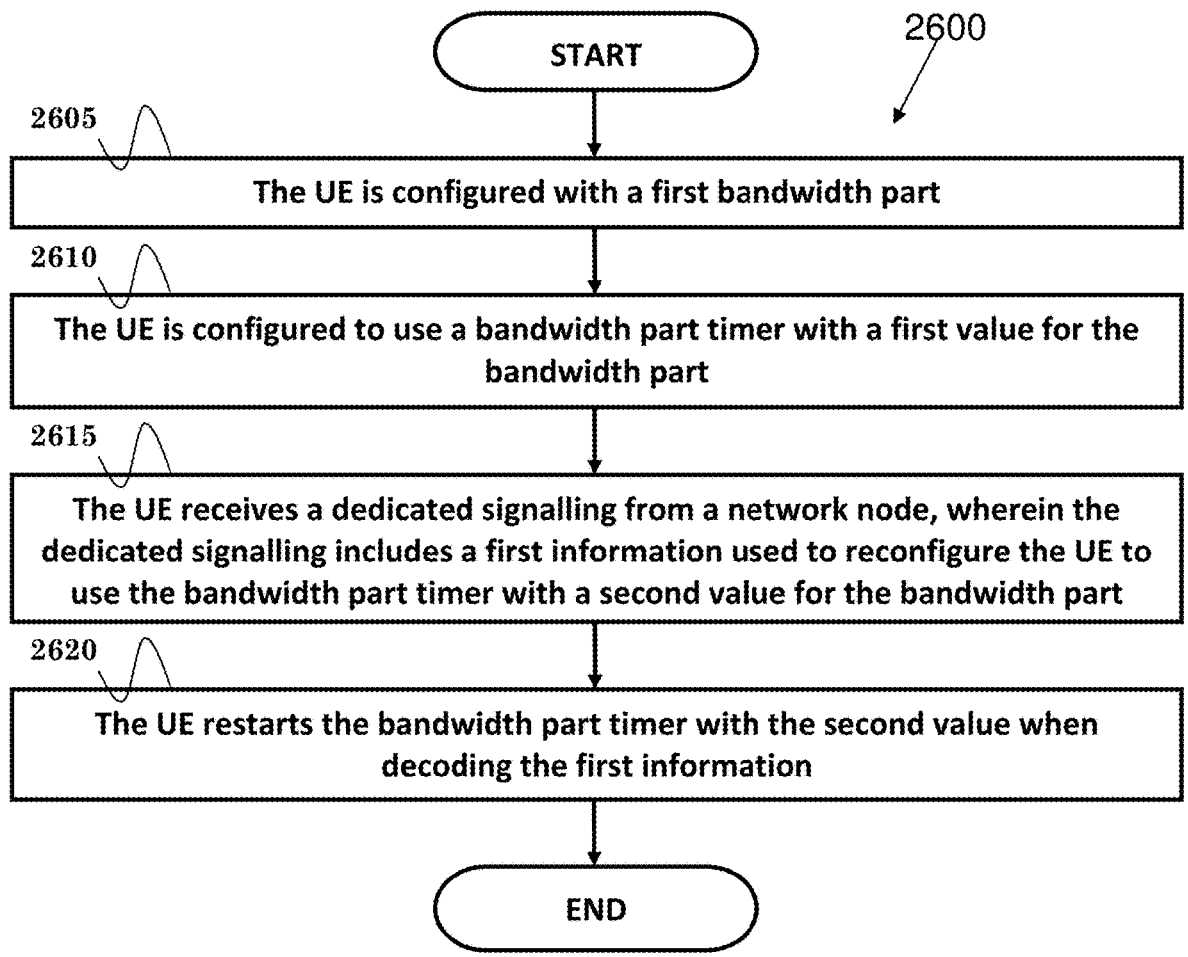
FIG. 26 is a flow chart according to one exemplary embodiment.

FIG. 26 is a flow chart 2600 according to one exemplary embodiment from the perspective of a UE. In step 2605, the UE is configured with a first bandwidth part. In step 2610, the UE is configured to use a bandwidth part timer with a first value for the bandwidth part. In step 2615, the UE receives a dedicated signalling from a network node, wherein the dedicated signalling includes a first information used to reconfigure the UE to use the bandwidth part timer with a second value for the bandwidth part. In step 2620, the UE restarts the bandwidth part timer with the second value when decoding the first information.

In one embodiment, the UE could start or restart the bandwidth part timer with the first value when receiving a PDCCH (Physical Download Control Channel) indicating a PDSCH (Physical Download Shared Channel) transmission and the PDSCH carries the dedicated signalling.

In one embodiment, the dedicated signalling could include a second information used to configure the UE with SPS resource on the bandwidth part. The dedicated signalling could be received by MAC layer of the UE. The dedicated signalling could be a downlink assignment.

In one embodiment, the first information could be received by the RRC layer of the UE. The first information could be a RRC message. The RRC layer of the UE could indicate the MAC layer of the UE to restart the bandwidth part timer with the second value. The length of the bandwidth part timer could be set based on the first value or the second value. The second value could be larger than or equal to the first value.

In one embodiment, the network could configure the UE to use the bandwidth part timer with the second value for the bandwidth part before releasing the SPS resource.

Referring back to FIGS. 3 and 4, in one exemplary embodiment of a UE, the device 300 includes a program code 312 stored in the memory 310. The CPU 308 could execute program code 312 to enable the UE (i) to be configured with a first bandwidth part, (ii) to be configured to use a bandwidth part timer with a first value for the bandwidth part, (iii) to receive a dedicated signalling from a network node, wherein the dedicated signalling includes a first information used to reconfigure the UE to use the bandwidth part timer with a second value for the bandwidth part, and (iv) to restart the bandwidth part timer with the second value when decoding the first information. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node, comprising:
    configuring a UE (User Equipment) with a bandwidth part;
    configuring the UE to use a bandwidth part timer for the bandwidth part;
    configuring the UE with SPS resource on the bandwidth part; and
    configuring the UE not to use the bandwidth part timer if length of the bandwidth part timer is shorter than SPS (Semi-Persistent Scheduling) interval for the SPS resource.

2. The method of claim 1, further comprising:
    not configuring the UE not to use the bandwidth part timer if the length of the bandwidth part timer is longer than or equal to the SPS interval for the SPS resource.

3. The method of claim 1, wherein the network node configures the SPS interval and configures the UE not to use the bandwidth part timer via different dedicated signallings or the same dedicated signalling.

4. The method of claim 3, wherein the dedicated signalling is RRC (Radio Resource Control) signalling.

5. The method of claim 1, wherein the bandwidth part timer is started or restarted if a downlink control information is transmitted to the UE on the bandwidth part, a packet is transmitted to the UE, or a packet is received from the UE on the bandwidth part.

6. The method of claim 1, wherein the UE switches from the bandwidth part to a default bandwidth part or an initial bandwidth part when the bandwidth part timer expires.

7. The method of claim 1, wherein the SPS resource is configured on the UE when the UE uses the bandwidth part timer.

8. The method of claim 1, wherein the SPS resource is a resource on which the UE periodically performs UL (Uplink) transmission or DL (Downlink) reception.

9. The method of claim 1, wherein the SPS interval is an interval between two UL (Uplink) transmissions or DL (Downlink) receptions performed by the UE based on the SPS resource.

10. A method of a network node, comprising:
    configuring a UE (User Equipment) with a bandwidth part;
    configuring the UE to use a bandwidth part timer with a first value for the bandwidth part;
    configuring the UE with SPS resource on the bandwidth part; and
    configuring the UE to use the bandwidth part timer with a second value if the first value is shorter than SPS (Semi-Persistent Scheduling) interval for the SPS resource,
    wherein the second value is larger than or equal to the SPS interval of the SPS resource and wherein the SPS interval is an interval between two UL (Uplink) transmissions or DL (Downlink) receptions performed by the UE based on the SPS resource.

11. The method of claim 10, further comprising:
not configuring the UE to use the bandwidth part timer with the second value if the first value is longer than or equal to the SPS interval for the SPS resource.

12. The method of claim 10, wherein the network node configures the SPS interval and configures the UE to use the bandwidth part timer with the second value via different dedicated signallings or the same dedicated signalling.

13. The method of claim 12, wherein the dedicated signalling is RRC (Radio Resource Control) signalling.

14. The method of claim 10, wherein the bandwidth part timer is started or restarted if a downlink control information is transmitted to the UE on the bandwidth part, a packet is transmitted to the UE, or a packet is received from the UE on the bandwidth part.

15. The method of claim 10, wherein the UE switches from the bandwidth part to a default bandwidth part or an initial bandwidth part when the bandwidth part timer expires.

16. The method of claim 10, wherein the SPS resource is configured on the UE when the UE uses the bandwidth part timer.

17. The method of claim 10, wherein the SPS resource is a resource on which the UE periodically performs UL (Uplink) transmission or DL (Downlink) reception.

* * * * *